(12) United States Patent
Toosky

(10) Patent No.: US 8,434,984 B2
(45) Date of Patent: May 7, 2013

(54) SELF-INTERLOCKING SLEEVE-CORE SHEAR PIN FASTENER

(75) Inventor: Rahmatollah F. Toosky, San Clemente, CA (US)

(73) Assignee: Polaris Fastening Consulting, LLC, San Clemente, CA (US)

(*) Notice: Subject to any disclaimer, the term of this patent is extended or adjusted under 35 U.S.C. 154(b) by 404 days.

(21) Appl. No.: 12/878,034

(22) Filed: Sep. 9, 2010

(65) Prior Publication Data

US 2011/0058916 A1 Mar. 10, 2011

Related U.S. Application Data

(60) Provisional application No. 61/241,006, filed on Sep. 9, 2009.

(51) Int. Cl.
*F16B 19/00* (2006.01)

(52) U.S. Cl.
USPC ........... 411/361; 411/55; 411/60.2; 411/80.6; 411/360; 411/362; 411/501; 411/504; 411/900

(58) Field of Classification Search .................... 411/34, 411/38, 55, 60.2, 80.6, 360, 361, 362, 363, 411/501, 502, 504, 508–510, 900
See application file for complete search history.

(56) References Cited

U.S. PATENT DOCUMENTS

| | | | |
|---|---|---|---|
| 1,116,710 A * | 11/1914 | Keller | 411/80.6 |
| 1,365,719 A * | 1/1921 | Ogden | 411/34 |
| 2,343,143 A * | 2/1944 | Gill | 411/38 |
| 2,531,048 A | 11/1950 | Huck | |
| 2,670,021 A * | 2/1954 | Torresen et al. | 411/34 |
| 2,763,314 A * | 9/1956 | Gill | 411/34 |
| 3,180,203 A * | 4/1965 | Vaughn | 411/34 |
| 3,345,900 A * | 10/1967 | Villo | 411/41 |
| 3,463,046 A * | 8/1969 | Wendt et al. | 411/34 |
| 3,505,921 A * | 4/1970 | Wigam | 411/34 |
| 3,750,525 A * | 8/1973 | Waters et al. | 411/34 |
| 3,785,241 A * | 1/1974 | Fischer | 411/38 |
| 3,789,728 A * | 2/1974 | Shackelford | 411/34 |
| 3,792,933 A | 2/1974 | Stencel et al. | |
| 3,916,970 A * | 11/1975 | Owens | 152/379.4 |
| 3,965,792 A | 6/1976 | King, Jr. | |
| 4,408,937 A * | 10/1983 | Hainke et al. | 411/42 |
| 4,850,771 A * | 7/1989 | Hurd | 411/43 |
| 5,051,048 A * | 9/1991 | Maddox | 411/34 |
| 5,259,714 A * | 11/1993 | Campbell | 411/34 |
| 5,312,215 A * | 5/1994 | Anquetin | 411/38 |
| 7,059,815 B2 * | 6/2006 | Ando et al. | 411/34 |

(Continued)

*Primary Examiner* — Roberta Delisle
(74) *Attorney, Agent, or Firm* — Heidi L. Eisenhut; Loza & Loza, LLP

(57) ABSTRACT

A novel one piece integrated fastener is provided which includes a deformable sleeve for receiving a pin where the pin has an elongated pin shank, terminating at a first pin end in a pin head and terminating at a second pin end in an externally threaded portion, and a transitional section integrally connected between the first pin end and the second pin end. The deformable sleeve may include a hollow tubular shank terminating at a first sleeve end in a sleeve head having an opening for receiving the pin and terminating at a second sleeve end having an internal sleeve head surface for engagement with the external pin head side surface when in an assembled position. The sleeve includes a first sleeve section, a second sleeve section and a third sleeve section having an internal surface for engaging the externally threaded portion of the pin upon installation.

20 Claims, 17 Drawing Sheets

U.S. PATENT DOCUMENTS

2004/0231467 A1 11/2004 Hufnagl et al.
2005/0002760 A1 1/2005 Hayashi et al.
2006/0193711 A1 8/2006 Di-Mola
2008/0075555 A1 3/2008 March et al.

* cited by examiner

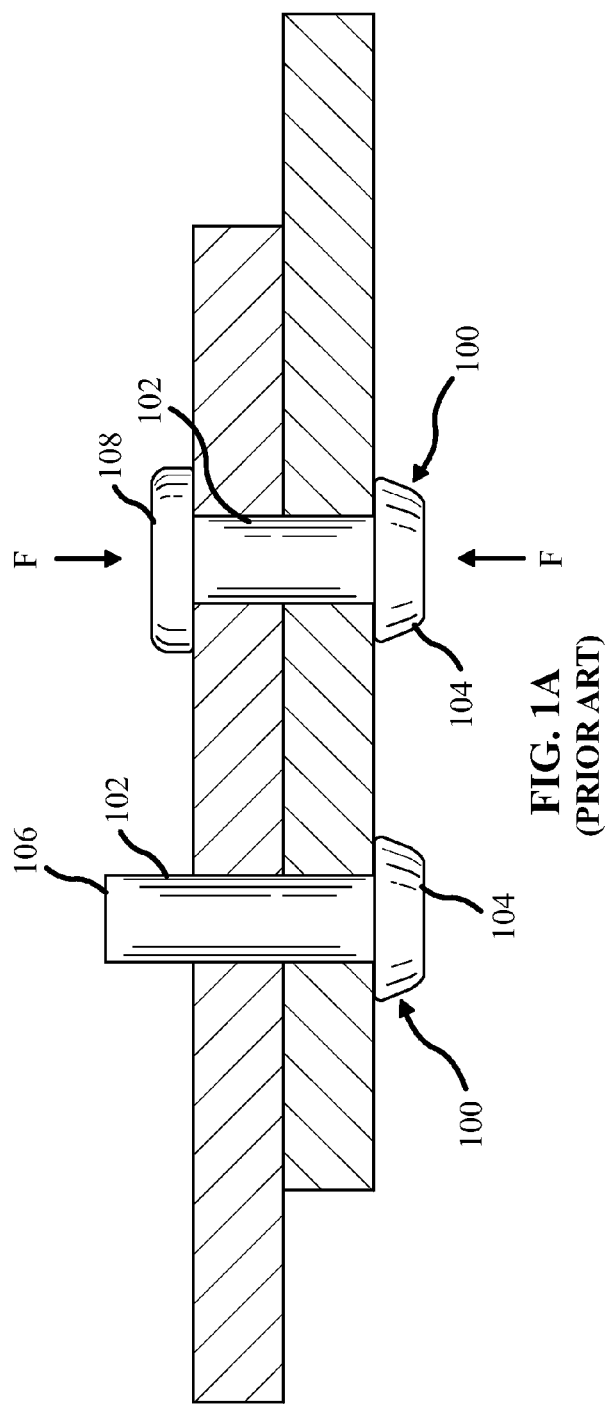
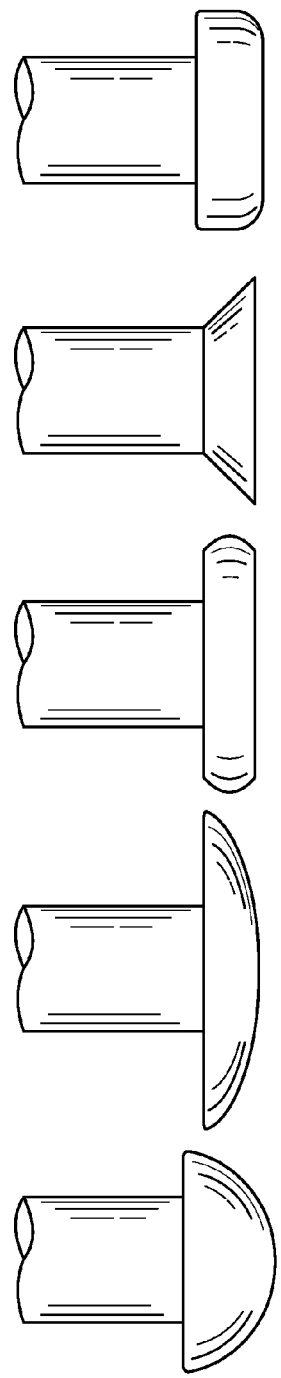
FIG. 1A (PRIOR ART)
FIG. 1B (PRIOR ART)

SELF-INTERLOCKING SLEEVE-CORE SHEAR PIN FASTENER

CLAIM OF PRIORITY UNDER 35 U.S.C. §119

The present application for patent claims priority to U.S. Provisional Application No. 61/241,006 entitled "SELF-INTERLOCKING SLEEVE-CORE SHEAR PIN FASTENER", filed Sep. 9, 2009 and is hereby expressly incorporated by reference herein.

FIELD

Various embodiments of the invention pertain to shear pin fasteners.

BACKGROUND

In general, complex man-made structures, whether stationary such as buildings and bridges, or mobile such as moving vehicles operating on land, sea, air, or space, are normally made from many components attached together forming a complex structure. The design of attachment points, commonly known as joints, requires special knowledge and skill for engineering design and analysis. A major part of this task is the selection of proper components, such as fasteners, for joining and fastening the structure together.

The main purpose and primary objective in joint design is to facilitate the load transfer from one component of the structure to another component. The joined structure should be able to sustain the external and internal loads that may be experienced during its intended function. Loading may be in sustained static form or in a variable dynamic form. The functioning environment may be corrosive in nature affecting material properties and integrity of the fasteners and structural material. The operating environment may also undergo temperature changes affecting the load carrying characteristics of the joint and fasteners. All these factors should be considered in joint design and fastener selection.

Since man's original venture into building structures and moving vehicles, many types of fasteners have been conceived, developed, and used successfully. However, with an ever advancing civilization the need for continuous improvement is always evident. One common feature in most joint designs is to create holes, or apertures, in the joint components, typically referred to as work pieces, to insert and attach the components to each other by placing a suitable fastener in the matching holes. These fasteners, referred to by many different names and terms, are major contributors for constructing buildings, tools, vehicles, and other important structures comprising the present form of civilization and physical life.

The demand for lightweight, high strength aerospace structural components requires usage of composite materials. Composite materials are composed of two major components: load carrying fibers and the bonding matrix. The load carrying components are made from high strength fibers, such as carbon fibers, and the bonding matrix is normally made from nonmetallic materials, such as epoxy, having much less mechanical strength.

Unlike homogenous metallic structures, the fibrous nature of composite material exhibits non homogenous mechanical properties, thus complicating the process of efficient load transfer at mechanical joints. Consequently, fasteners suitable for joining composite structures are needed. Those skilled in the art of fastening understand that efficient load transfer at mechanically joined structures requires a material exhibiting a certain degree of compliance and resiliency. Metallic structures exhibit resiliency and compliance, but the composite materials, lacking adequate ductility, are brittle in nature and are subject to unpredictable brittle type failure at the joint.

The brittle nature and the lack of resiliency of composite materials will cause non uniform distribution of loads to multiple fasteners installed in a single joint. The installation loads required for installing ordinary fasteners will often generate high levels of compressive stresses around the fastener holes of the structure. These compressive forces, when directly applied on composite structures, cause damage in the form of cracks, delamination, and fiber breakage, which adversely affect the load carrying capability of the structure, specifically around the holes in the structure. A new fastener design which minimized this type of damage is needed.

The issue of proper distribution and sharing of the load between the fasteners and the structural components of the joints having multiple fasteners may be partially achieved by precision drilling of close tolerance holes and implementing a process of perfect hole alignment, such as precision match drilling of the holes. However, this solution is extremely difficult to achieve in practice and is very expensive. This problem can also be resolved by utilizing a hole filling type fastener design. The special challenge is that composite structures do not tolerate hole expansion readily since hole expansion tends to cause delamination and cracks in the structure and around the hole aperture. Therefore, while hole filling is desirable, excessive hole expansion of the structure needs to be avoided.

Consequently, a system of fasteners which alleviates the problems inherent in conventional fasteners as described previously is needed.

SUMMARY

One feature is directed to a fastener for securing one or more components of a structure. The fastener may include a pin having an elongated pin shank, terminating at a first pin end in a pin head and terminating at a second pin end in an externally threaded portion, and a transitional section integrally connected between the first pin end and the second pin end, the pin head having an external pin head side surface; and a deformable sleeve having a hollow tubular shank terminating at a first sleeve end in a sleeve head having an opening for receiving the pin and terminating at a second sleeve end having an internal sleeve head surface for engagement with the external pin head side surface when in an assembled position. The hollow tubular shank may include a first sleeve section integrally connected to the first sleeve end; a second sleeve section integrally connected to the first sleeve section; and a third sleeve section, integrally connected to the second sleeve section and the second sleeve end, having an internal surface for engaging the externally threaded portion of the pin upon installation.

Yet another feature provides for multi-component fasteners capable of being handled as a single integrated component for installation in composite or metallic structures.

Yet another feature provides for a fastener having an inner core pin and a sleeve/collar such that the collar portion of the sleeve engages and interlocks with the locking grooves of the inner core pin during installation of the fastener.

Yet another feature provides for a fastener having controlled hole filling capabilities for joining and fastening together work pieces made from brittle materials, such as carbon fiber composite materials.

Yet another feature provides for a fastener having sufficiently high shear and tensile strength to match the joint strength requirement of both metallic and composite materials, while also having adequate hole filling capabilities to noticeably enhance fatigue properties of metallic structures.

Yet another feature provides for a fastener having a soft formable outer sleeve component and a high strength inner core pin to provide shear and tensile strength in addition to hole filling capabilities, with resiliency, compliance, and efficient load transfer for application in composite materials.

Yet another feature provides for a fastener made from a material having special characteristics for an outer sleeve and an inner core pin such that the combination satisfies the corrosion properties required of fastened joints.

Yet another feature provides that the geometry of the inner core pin and sleeve components of the fastener allow the fastener to be installed in work pieces using installation processes similar to common practices in production of aerospace structures.

Yet another feature provides that an inner core pin be utilized to assist in formation of an upset head during installation of the fastener by a portion or section of the inner core pin engaging internally with the sleeve. The geometry of the inner core pin and sleeve, in conjunction with a special tool, such as an anvil, allow for pressured used to form the upset head against a structure be minimized so as to not damage the structure.

Yet another feature provides a fastener made from materials having properties allowing for the joinder of both metallic structures and non-metallic component structures.

Yet another feature provides for a series of fasteners having design features which are simple to produce, rugged, dependable and economically desirable, offering cost reduction and enhanced properties.

Yet another feature provides for a multi-component fastener that allows each component to be formed from different materials and have varied mechanical and physical properties to further enhance fastener function and improve joint efficiency.

Yet another feature provides for a pre-assembled multi-component collar which may be used with fasteners of the present invention in addition to current lockbolt pin designs.

The features of the present invention allow for the design of numerous fasteners, including but not limited to, (1) an integrated self-interlocking sleeve/locking collar design with stump type pin design to be handled as a single component in assembly line installations in metallic structures; (2) an integrated multi component sleeve locking collar design to be used in lieu of a single piece sleeve to simplify manufacturing of sleeve componenst, and also to allow for selection of different materials with special properties within the sleeve component; (3) an integrated self-interlocking sleeve/locking collar and stump type pin design for limited hole filling capabilities to be handled as a single component for installation in composite structures, or in metallic structure applications intended for significant interference fit installations, and for enhanced fatigue properties; (4) an integrated and enclosed self-interlocking sleeve/locking collar with stump type pin design for self sealing capabilities to be handled as a single component for installation in composite structures or in metallic structures; (5) an integrated and enclosed self-interlocking sleeve/locking collar with stump type pin design for self sealing and limited hole filling capabilities to be handled as a single component for installation in composite structures or in metallic structures; (6) integrated self-interlocking sleeve/locking collar with pull type pin design to be handled as a single component for installations in metallic structures; and (7) an integrated self-interlocking sleeve/locking collar with pull type pin design for limited hole filling capabilities to be handled as a single component for installation in composite structures or in metallic structures.

BRIEF DESCRIPTION OF THE DRAWINGS

Various features, nature and advantages may become apparent from the detailed description set forth below when taken in conjunction with the drawings in which like reference characters identify correspondingly throughout.

FIG. 1 (comprising FIGS. 1A and 1B) illustrates cross sectional views of typical solid rivets.

DETAILED DESCRIPTION

Figure 2:
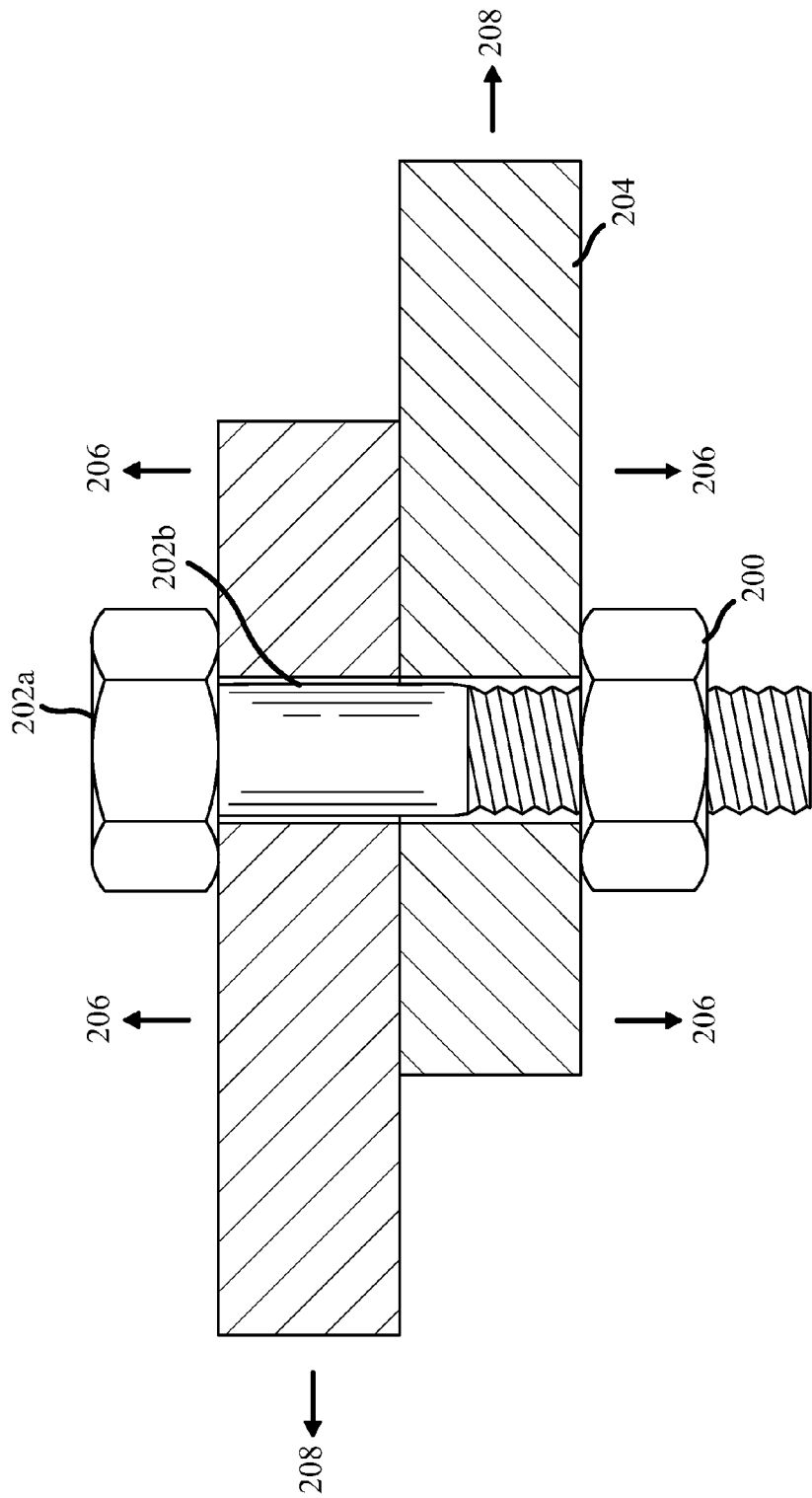
FIG. 2 illustrates a cross sectional view of a typical nut and bolt.

In the following description numerous specific details are set forth in order to provide a thorough understanding of the invention. However, one skilled in the art would recognize that the invention might be practiced without these specific details. In other instances, well known methods, procedures, and/or components have not been described in detail so as not to unnecessarily obscure aspects of the invention.

Solid Rivets

FIG. 1A illustrates a cross sectional view of a structural joint using typical solid rivets 100 utilized in joining of aerospace structures, general construction and many other commercial applications. A rivet 100 is a permanent mechanical fastener that, prior to installation, consists of a smooth cylindrical shaft 102 with a head on one end 104 and a buck-tail 106 on the other end. When installed, the rivet 100 is placed in a punched or pre-drilled work hole and the tail is upset or bucked 108 (i.e. deformed), by applying an axial forming load "F" to each end of the rivet 100, expanding to about 1.5 times the original shaft diameter, holding the rivet 100 in place.

Solid rivets are very reliable and used in many applications, generally in large quantities, to transfer shear loads in the joint. However, as the material used for making solid rivets needs to be malleable and soft to form the upset head, typical solid rivets are unable to resist high value shear loads and consequently limiting the application of rivets 1 for use in high shear transfer joints.

Solid rivets may be made in several head styles, as shown in FIG. 1B, are single component fasteners, and are normally formed from a single material. Solid rivet head styles may include, but are not limited to, button, truss, flat, countersink and pan.

Nuts and Bolts

FIG. 2 illustrates a cross sectional view of a structural joint using a typical nut 200 and bolt 202 utilized in joining of aerospace structures, general construction and many other commercial applications. Nuts and bolts (comprising a bolt head 202a and a bolt shank 202b) are versatile, useful and effective fasteners used for joining many types of structures both in static and dynamic applications. The internal helical threads of the nut 200 engage the matching external threads of the bolt 202 and, by turning the nut 200 relative to the bolt 202, the interfacing surface of the nut and bolt with the surface of the structure 204 will push the structural components tightly together. By applying the proper magnitude of tightening torque, the desirable preload required to join the components of the structure together is achieved. Nuts and bolts are capable of carrying both tensile loads 206 and shear loads 208.

However, major disadvantages in the usage and application of nuts and bolts in structures exist, such as the lack of a hole filling feature, relatively expensive components, and the fact that achieving and maintaining a desirable preload is often difficult. Also, the installation process can be costly and time consuming, especially within a large structure where cooperation between two operators is required, one for holding the bolt and the other for turning the nut. Additionally, both sides of the structure must also be accessible to perform this installation process and in aerospace structures, accessibility to fastener holes is often very restricted.

Blind Bolts (Blind Fasteners)

Blind fasteners were invented to simplify the installation process and address the previously stated issues of restricted accessibility. The term blind fastener signifies the feature allowing the fastener to be installed from one side of the structure, thus accommodating for installation applications where only one side of the structure is accessible. The complimentary benefit is that, with the aid of special tools, a single operator alone can install the fastener in the structure quickly and effectively, thus reducing the installation costs.

Many types of blind fasteners have been invented and are being used in significant numbers for attaching all types of structures, especially for attaching aerospace structural components where space and accessibility is restricted. Some blind fastener designs offer the strength to replace solid rivet applications and are normally known as Blind Rivets (50 ksi typical shear strength.) Other blind fasteners, having higher shear strength values in excess of 90 ksi are used to replace nuts and bolts, and thus termed Blind Bolts.

Figure 3A:
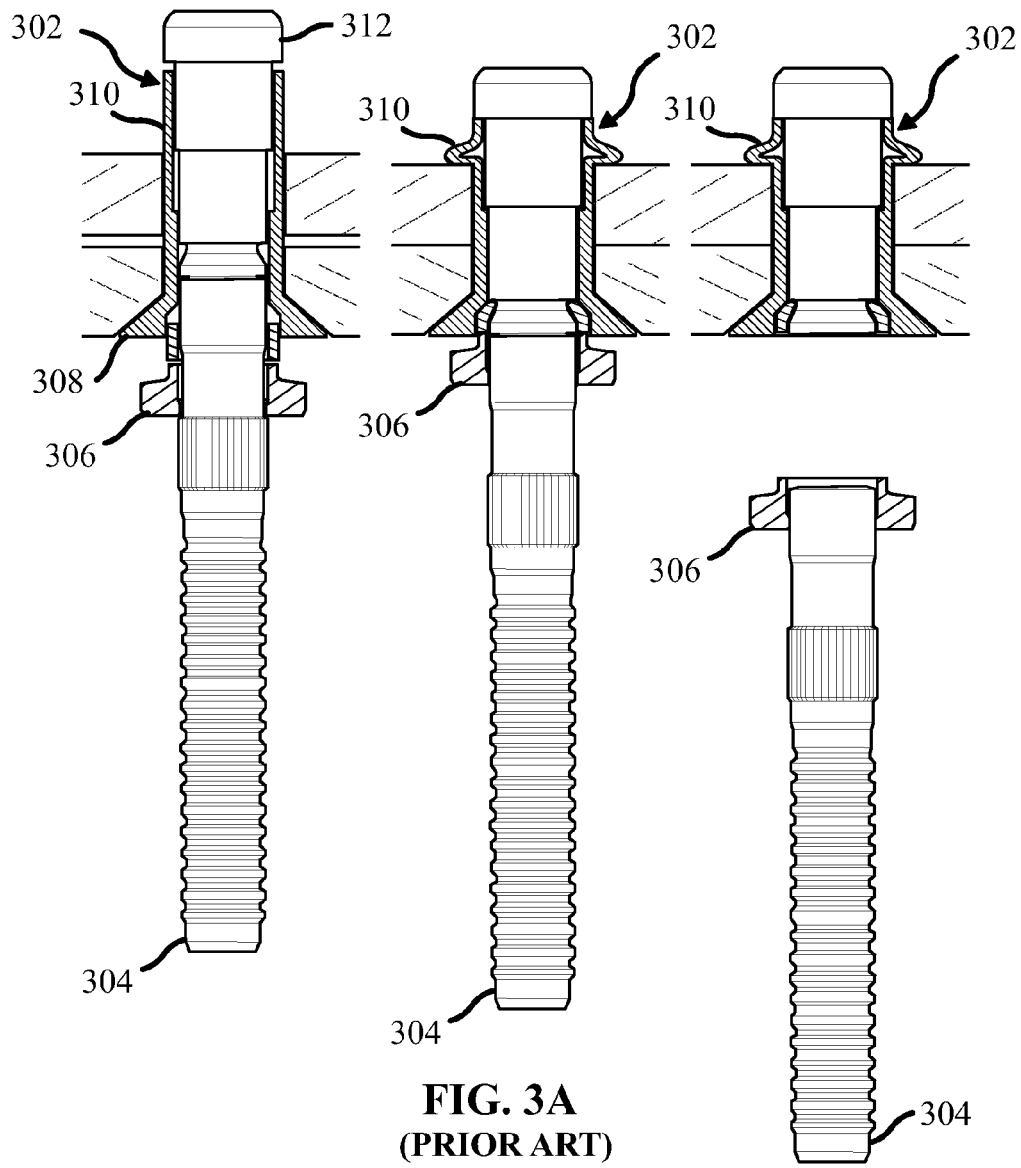
FIG. 3A illustrates cross sectional views of a typical blind bolt during a typical installation sequence in a structure.
Figure 3B:
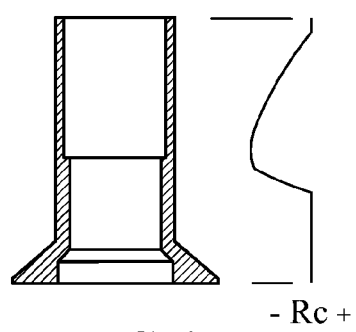
FIG. 3B illustrates a typical hardness profile of the blind bolt of FIG. 3A.

FIGS. 3A-3B illustrate cross sectional views of a typical blind bolt during a typical installation sequence and a typical hardness profile, respectively. A blind bolt generally comprises three components: the sleeve 302, the pin 304, and the lock collar 306. The sleeve 302 comprises an enlarged manufactured head 308 and a sleeve shank 310. The manufactured head is of specific design, normally either protruding or flush design. The sleeve shank 310, which becomes deformed by the pin head 312, has been processed in such a way that it has an axially variable strength in the deformable region extending beyond the work piece, with the softest portion always adjacent to the work piece top surface, as shown in FIG. 3B.

The assembled fastener is placed into the matching holes of the work piece and the pin is pulled by a suitable installation tool. This allows the enlarged end of the pin in contact with the sleeve end to apply compressive loads on the sleeve end, forming the blind side upset head in the soft exposed sleeve portion against the work piece.

After application of adequate load to complete the formation of the blind head, the internal step of the sleeve interferes with the external step on the pin creating interference forces which prevents further axial movement of the pin. The lock groove of the pin and the internal dimple of the sleeve are then aligned and the design is such that the volume of the cavity created is equivalent to the volume of the, normally preassembled and integrated, locking collars. A setting anvil of the installation tool is then used to force the locking collar into the open cavity and create further resistance against axial movement of the pin, further increasing the pulling load applied by the installation tool, thus causing the pin to break in the designated break notch area at a designated load. The broken pin tail is discarded, completing the installation process. However, several disadvantages exist when using blind bolts, such as lack of hole fill and difficulties in manufacturing, especially in the creation of the variable hardness curve, leading to scrap and unpredictability in the fastener.

Lockbolts

Figure 4A:
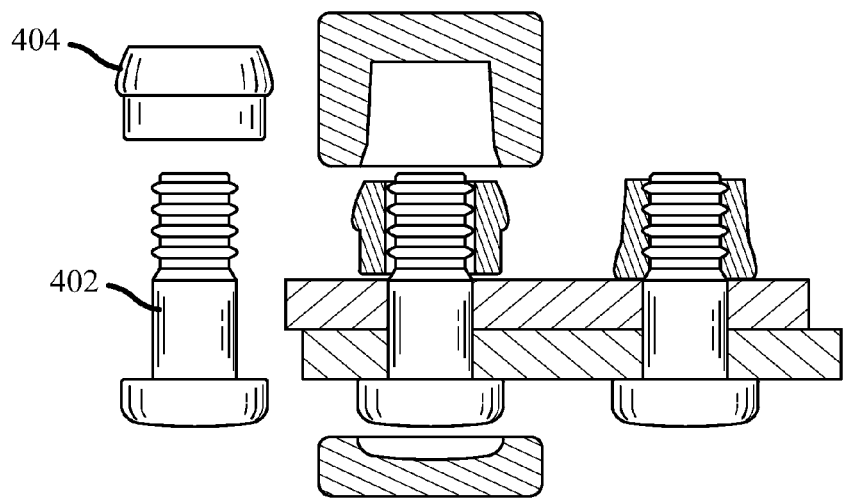
FIG. 4A illustrates cross-sectional views of the installation of a typical stump type lockbolt in a structure.
Figure 4B:
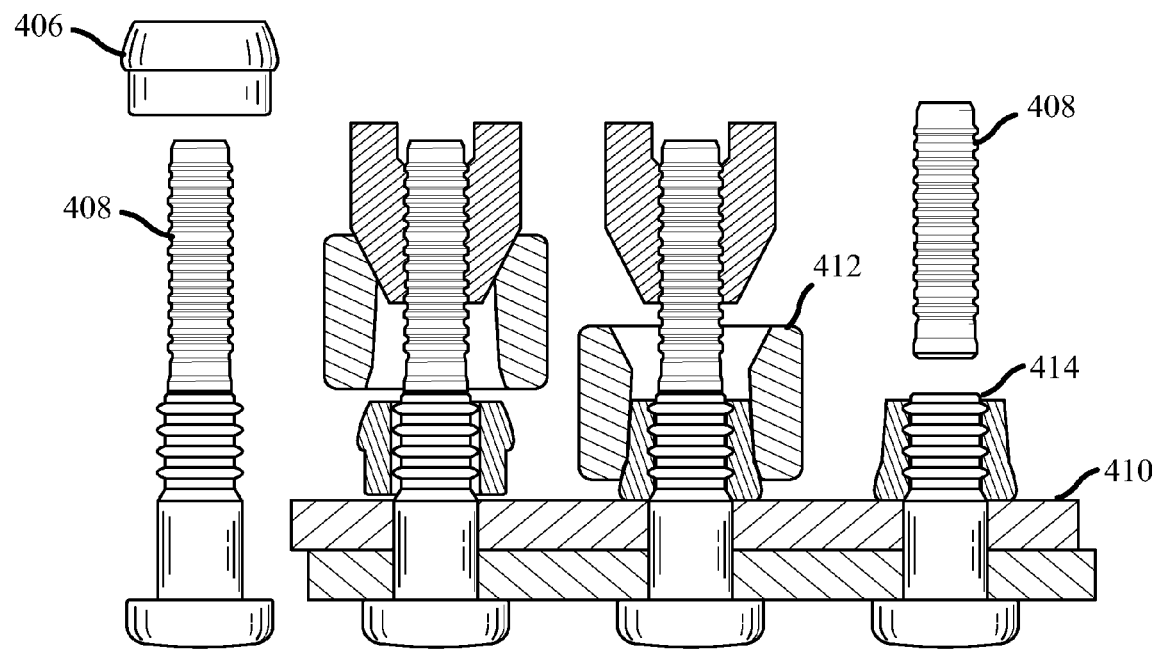
FIG. 4B illustrates cross-sectional views of the installation of a typical pull type lockbolt in a structure.

Another type of fastener that has found wide range application in many industries, especially in the field of aerospace, is used is a lockbolt. Lockbolts, as shown in FIG. 4A, are two-piece metal fasteners, comprising a pin 402 with segmented threads and a collar 404, that are typically implemented in two basic designs; a pull type design and a push type design (also known as a stump lockbolt). A cross sectional view and installation sequence of a typical pull type lockbolt is illustrated in FIG. 4B while a cross-sectional view of a typical stump type lockbolt is illustrated in FIG. 4A.

In the pull type design, after placing the pin in the prepared matching holes within the structural components, the collar 406 is placed over the pin tail 408 of a pin and against the structure. With the aid of a special tool having a set of pulling Jaws and an Anvil of specific geometry, the collar 406 is then pushed against the work piece 410 and, with the aid of specially designed swaging anvil 412, is pressed radially inward into lock grooves at the same time the pin is being pulled axially, through the interaction of the tool pulling jaws on the pin tail. As the installation load builds, the collar is locked into position within the lock grooves and the pin breaks off at the break notch 414, completing the installation process.

However, one of the short comings of lockbolt design includes the fact that lockbolts are fundamentally two piece fasteners, a pin and a collar, which are to be engaged together during the installation process of the fastener into the structure. Handling of two different components causes difficulty in the assembly line, and is complicated further when the two components must be applied from each side of the work piece. The difficulties of handling two components are magnified in the case of automated assembly. This also creates problems with inventory cost and matching the correct pin and collars at the point of installation.

Another issue is that lockbolts lack basic hole filling capabilities due to the fixed diameter of the pin. Hole filling and interference fit installations are very desirable for metallic structures to improve fatigue life. Limited hole filling capability, without damaging the work piece, is also essential for the installation of lockbolts in composite structures.

Overview

In accordance with an aspect of the present invention, a one piece integrated fastener which provides ease of installation and improved productivity in assembly lines, such as automation assembly, is disclosed. Using a one piece integrated fastener may be more efficient than fasteners having multiple pieces as the sleeves, pins, and collars of the fastener do not have to be handled separately.

In accordance with another aspect, a one piece (single) integrated sleeve pin design is provided such that the fastener may be easily handled as a single component. Additionally, the one piece integrated sleeve pin allows for special designs such that predetermined limited hole fill and self sealing, can be achieved for both metallic and composite applications.

Exemplary Fastener

Figure 5:
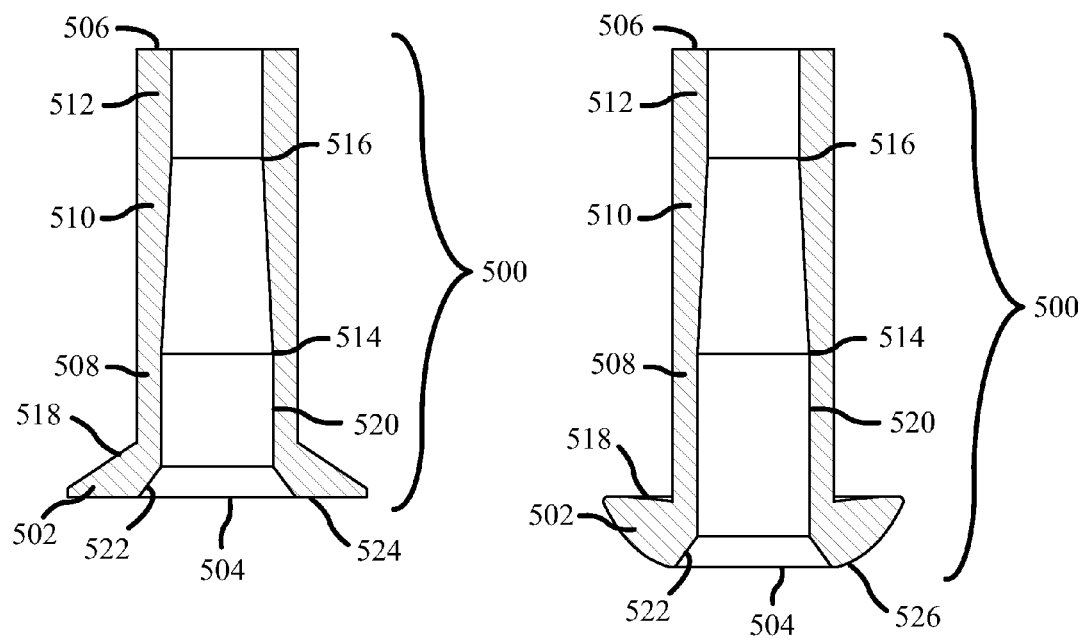
FIG. 5 illustrates side views of hollow tubular interlocking deformable sleeves, in accordance with an aspect of the present invention.
Figure 7:
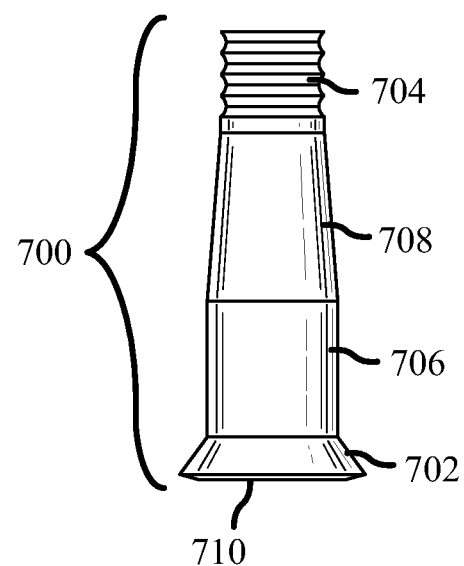
FIG. 7 illustrates a side view of a pin, in accordance with an aspect of the present invention.

According to various aspects, a fastener may include an interlocking deformable sleeve as shown in FIG. 5 and an inner core pin as shown in FIG. 7. Turning to FIG. 5, side views of hollow tubular interlocking deformable sleeves 500 in accordance with an aspect of the present invention are illustrated. As shown, an interlocking deformable sleeve 500 may include an elongated hollow cylindrical sleeve portion (or shank) terminating at a first sleeve end in an enlarged preformed sleeve head 502, having an opening in an outer top surface 504 for receiving the pin, and terminating at a second sleeve end, having an opening in outer bottom surface 506.

Figure 8:
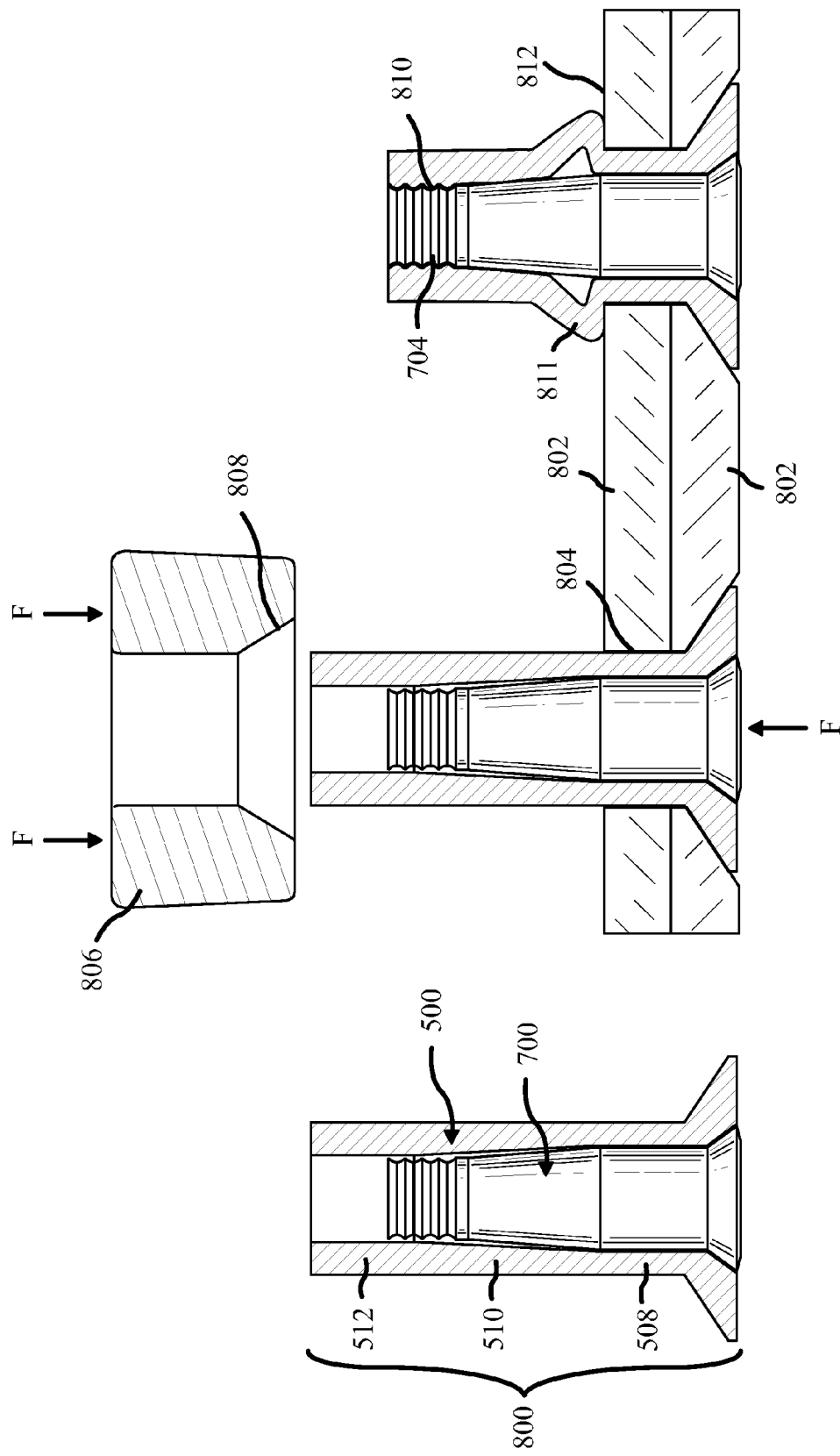
FIG. 8 illustrates the process of an assembled fastener being secured to a structure, in accordance with an aspect of the present invention.

The sleeve head 502 may have an internal face (or internal sleeve head surface) 522 configured for engagement with (or to accommodate and interface with) an external pin head side surface 702 of the pin 700 (See FIG. 7) and an external face (or external sleeve head surface) 518 configured for engagement with (or to accommodate and interface with) a bottom surface face or prepared aperture 804 of a structure 802 (See FIG. 8). That is, the form and shape of the sleeve head 502 may be designed so that the geometry of the internal sleeve head surface 522 and the external sleeve head surface 518 of the sleeve 500 may be engaged with (i.e. matched), or directly aligned with, the external pin head side surface 702 and a bottom surface of a structure 800 respectively (See FIG. 7 and FIG. 8).

The cylindrical sleeve portion may have an outer wall and an inner wall defining an opening 520 in the sleeve 500. Additionally, the cylindrical sleeve portion may comprise a first sleeve section 508, a second sleeve section 510 and a third sleeve section 512. As shown, the outer top surface may be, for example, flat 524 across the entire surface or may have rounded ends 526.

The first sleeve section 508 may be of uniform diameter such that the outer wall of the first sleeve section 508 is straight or at a 90° angle relative to the flat surface of the outer top surface 504 of the preformed head 502. The second sleeve section 510 may be of variable diameter such that the second sleeve section 510 tapers inwardly from a first point 514 to a second point 516, the first point 514 may be integrally connected to the first sleeve section 508 and the second point 516 may be integrally connected to the third sleeve section 512. In one aspect, the largest diameter of the second sleeve section 510 may be equal to the diameter of the first sleeve section 508 and the smallest diameter of the second sleeve section 510 may be equal to the diameter of the third sleeve section 512.

Figure 6:
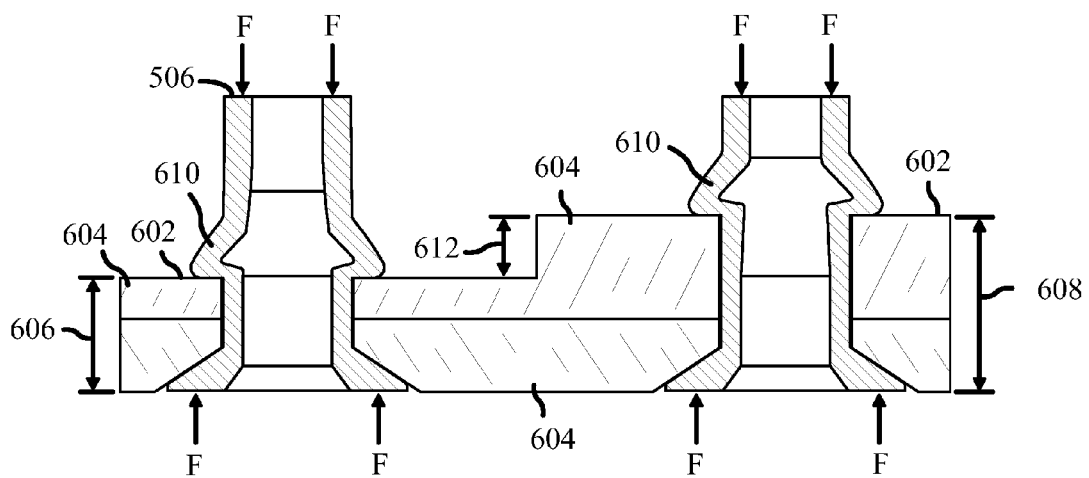
FIG. 6 illustrates the sleeve of FIG. 5 being upset flush to a surface of a structure having varying thickness, in accordance with an aspect of the present invention.

FIG. 6 illustrates the sleeve 500 of FIG. 5 being upset flush to a surface 602 of a structure 604 having varying thickness. As shown, the largest diameter of the second sleeve section 510 may be determined by a minimum grip 606 and a maximum grip 608 for the intended application. That is, each fastener may have predefined minimum and maximum values for thickness of material, or material stack up, for which it can be properly installed. For example, this range is typically 0.062" but can vary by fastener family. That is, the difference between the minimum grip 606 and the maximum grip 608 may be 0.062". As a result, a family of fasteners, i.e. fasteners of the same design but of different lengths and/or diameters, can cover a wide total range of thicknesses and hole diameters to be installed into. The second sleeve section 510 may be designed such that upon application of an installation load "F" at the outer bottom surface 506 of the sleeve 500, the second sleeve section 510 may buckle downward, expanding radially outward to form an upset head 610 in an intended grip range 612 while exerting an axially downward load against the surface 602 of the work piece 604. The third sleeve section 512 may be of a specific geometry for engaging with a locking groove section (or externally threaded portion) 704 of the inner core pin 700 (see FIG. 7), to form a permanent interlocking feature 804 (see FIG. 8) with the inner core pin 700 and provide enhanced mechanical properties. That is, the permanent interlocking feature 804 reinforces the sleeve which is securing the two work pieces together between the manufactured head 502 and the upset head 610 which may provide for enhanced fatigue life and higher values in tensile testing, compared to convention fasteners. The permanent interlocking feature 804 may include the third sleeve section 512 expanding outwardly into the locking groove section (or externally threaded portion) 704 of the pin 700.

Turning to FIG. 7, a side view of the inner core pin 700 in accordance with an aspect of the present invention is illustrated. The inner core pin 700 may include an elongated pin shank terminating at a first pin end in a head section 702 and terminating at a second pin end in a locking groove section (externally threaded portion) 704. The elongated pin shank may include a first pin (or shank) section 706, a second pin (or transitional) section 708 and the locking groove section (externally threaded portion) 704. Although the head section 704 may be in the form of a flush head design 710, as shown, this is by way of example only and other geometrical designs as required by the application of the fastener are contemplated.

The first pin (or shank) section 706 may be inserted into the opening (or internal hole) 520 (See FIG. 5) of the sleeve 500 with or without an interference fit, depending on the specific design for a specific application. For example, the first pin (or shank) section 706 may be a few thousandths larger than the opening (or internal hole) 520 resulting in the first pin (or shank) section 706 being forced (i.e. interference fit) into the opening (or internal hole) 520 when assembling the fastener.

The second pin (or transitional) section 708 may include a specific geometry, such as a taper or curvilinear design, to engage (or match) with the second sleeve section 510 (see FIG. 5) of the sleeve 500 and, depending on specific design functions, may assist in the proper forming of the sleeve upset head 610 (see FIGS. 6 and 8) and locking groove section (externally threaded portion) 704, of which the shape, size, geometry, and design of the locking grooves, or threads, may vary depending on the required performance of the fastener and material combination of the sleeve 500 and inner core pin 700.

The inner core pin 700 and the sleeve 500 may be combined to form a single assembled fastener 800 as shown in FIG. 8. In this assembled form, the fastener 800 may be handled as a single piece fastener thus greatly simplifying the installation process.

Figure 9:
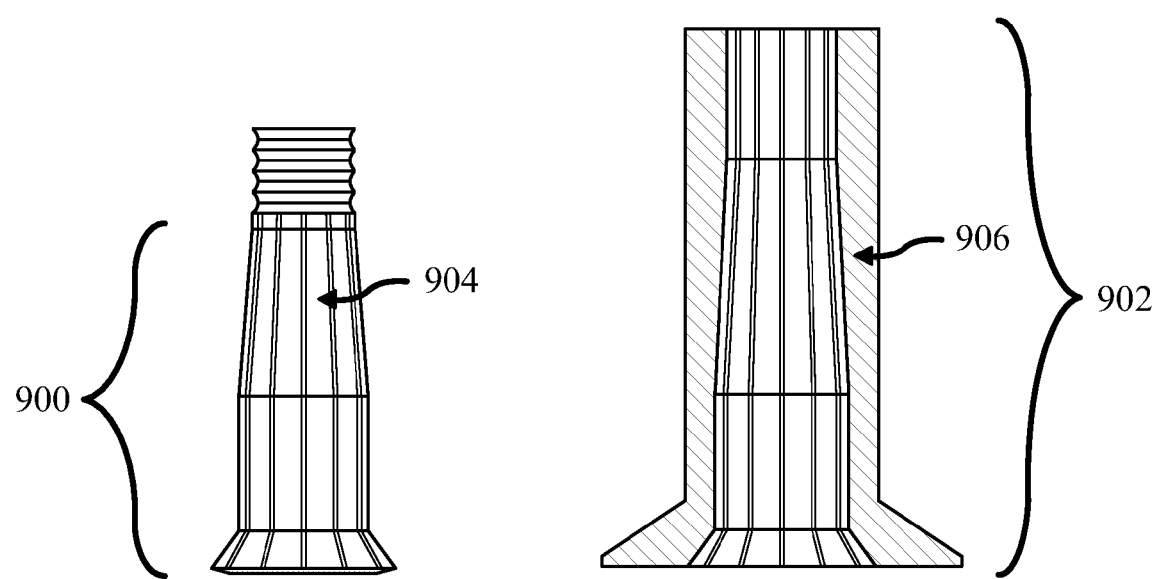
FIG. 9 illustrates side views of a pin and sleeve, in accordance with an aspect of the present invention.

Depending on the structural requirements and functional demands, the inner core pin 700 and sleeve 500 may vary in design, material choice, and selection of finishes and coatings to improve the overall performance of the fastener for the intended joint design and function. This could include geometrical surface design configurations such as axial, radial, and or helical ridges, grooves, and/or knurls on the core pin and/or internal surface of the sleeve. As shown in FIG. 9, a pin 900 may include a plurality of vertical grooves, or threads, on the outer surface 904 which corresponds to a plurality of vertical grooves 906 on the inner surface of the sleeve 902.

Fastener Installation

FIG. 8 illustrates the process of an assembled fastener 800 being secured to a work piece, or structure, 802 in accordance with an aspect. As shown, the assembled fastener 800 may be placed in a prepared aperture 804 in the work piece, or structure, 802. The prepared aperture 804 may be of a specific geometry such that it corresponds with the size and shape of the assembled fastener 800. Next, a forming anvil 806 may be placed over the end of the sleeve 500 and an installation force F may be applied to both ends of the assembled fastener 800. The forming anvil 806 may be designed such that its internal structure 808 corresponds to the shape of the assembled fastener 800. As the force F is applied, the sleeve 500 may deform at the second sleeve section 510, spreading radially outward, while collapsing itself such that the upset head 810 created may be in direct contact with the surface 812 of the work piece, or structure, 802.

The proper formation of the upset head 810 may be enhanced by the interaction of the second pin (or transitional) section 708 (see FIG. 7) of the inner core pin 700 with the second sleeve section 510 of the sleeve 500 if geometries are made such that these two sections contact each other during the formation of the upset head 810.

After formation of the upset head 811, continued application of the force F on the forming anvil 806, which as described above has an internal geometry 808 corresponding to the geometry of the assembled fastener 800, may force the third sleeve section 512 of the sleeve 500 inwardly around the external grooves on the locking groove (or externally threaded) section 704 of the inner core pin 700, creating a permanent interlocking feature 810. The intimate engagement and interlocking of the sleeve 500 and inner core pin 700 may enhance the functionality and tensile properties of the installed fastener. The installation process may then be completed. The inner core pin 700 and the sleeve 500, permanently interlocked within the work piece 802, may effectively resist the shear and tensile loads applied to the joint.

Optionally, the assembled fastener 800 can be designed such that while the sleeve 500 is made from soft, ductile material, the inner core pin 700 material may be very strong, thus increasing the shear load carrying property of the assembled fastener 800. The proper option of choosing different materials for sleeve 500 and core pin 700 enables matching physical properties of the fastener to the structure for unique applications, such as highly corrosive environments.

Furthermore, the geometry of the grooves in the locking groove section 704 may be of specific configuration to create tensile preload in the inner core pin 700 during the interlocking process with the third sleeve section 512 of the sleeve 500, keeping the work piece (or structural components) 802 of the joint tight together under the induced compressive forces and further improving the performance and mechanical properties of the joint. Theoretical and empirical analysis have demonstrated that fatigue life of structural joints improve significantly when the structural components are joined together with adequate preload in the joining fasteners.

Multi Component Sleeve/Collar Design

Figure 10:
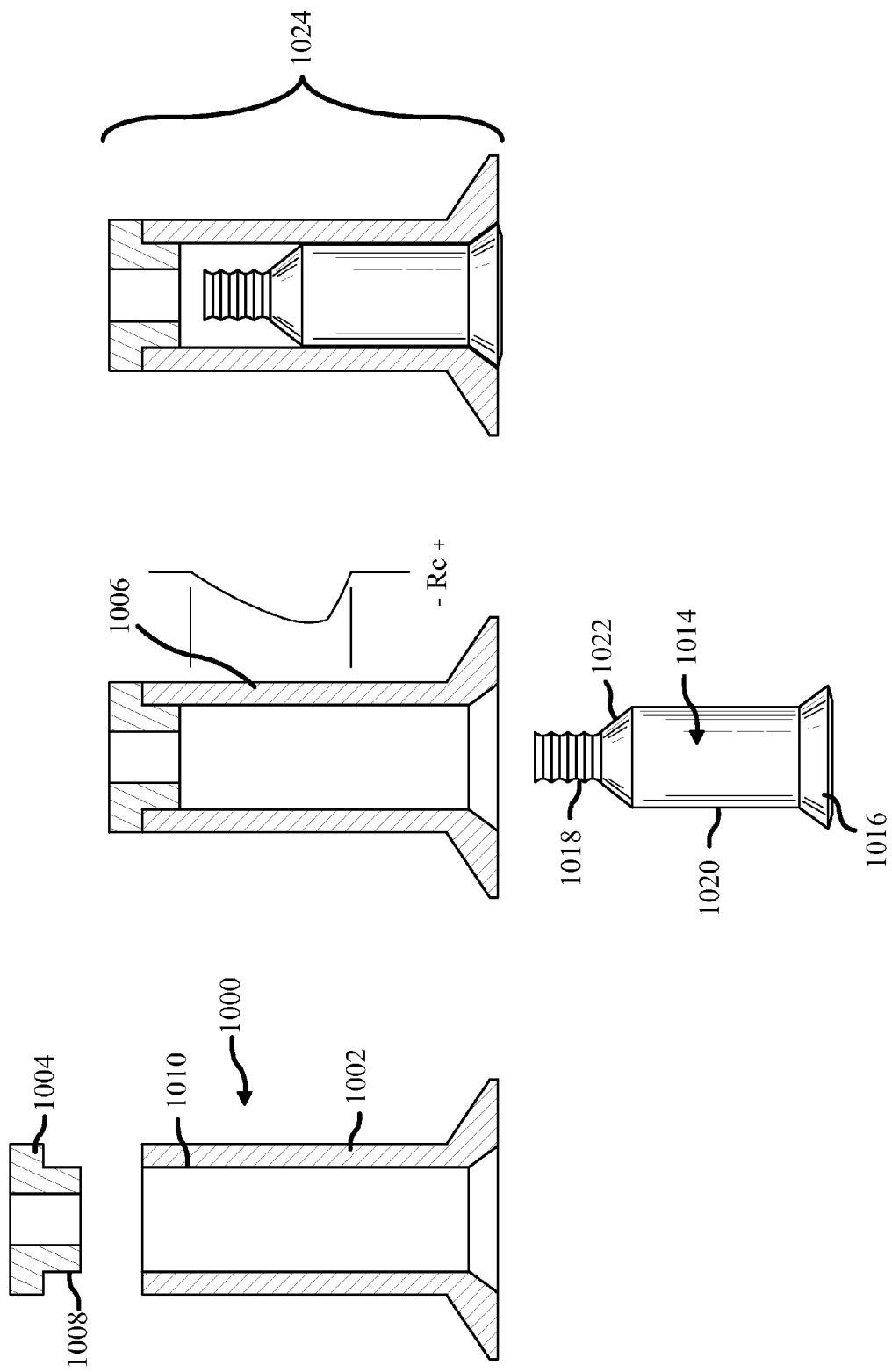
FIG. 10 illustrates side view assembly of a multi-component deformable sleeve of a fastener incorporating a straight walled sleeve, in accordance with an aspect of the present invention.
Figure 11:
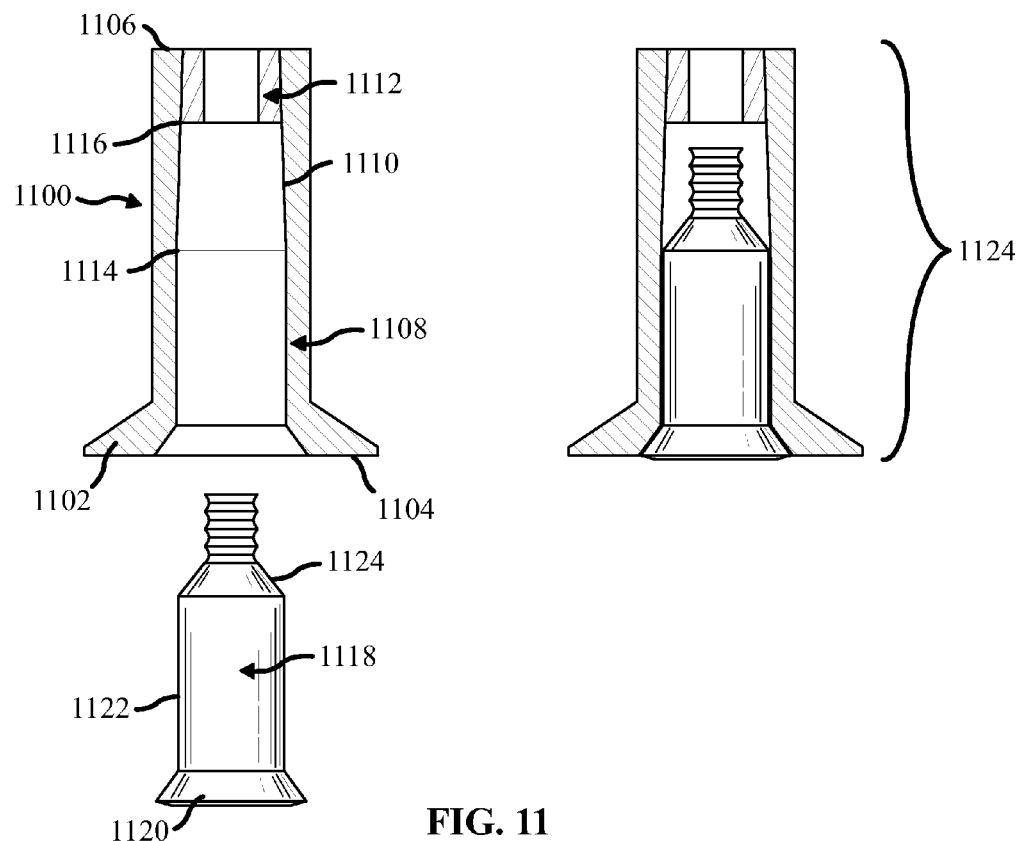
FIG. 11 illustrates side view assembly of a multi-component deformable sleeve of a fastener incorporating a tapered walled sleeve, in accordance with an aspect of the present invention.

FIGS. 10 and 11 illustrate side views of the assembly of a multi-component deformable sleeve of a fastener incorporating a straight walled sleeve 1000 and a tapered walled sleeve 1100, respectively. As the sleeve has multiple functions, such as securing work pieces together while also acting as the collar, the demand on specific material properties of various sections of the sleeve may vary. For example, one portion or section of the sleeve may need to be more malleable for ease of swaging, or one portion or section of the sleeve may require stronger properties that allow for adequate shear strength while still accommodating for radial expansion and the formation of the upset head. Therefore, it may be beneficial to have the sleeve made from a combination of materials and allow for alterations of mechanical properties by heat treatments, as shown in FIG. 10.

As shown in FIG. 10, the straight walled sleeve 1000 may comprise an elongated hollow cylindrical sleeve portion 1002 and a collar portion 1004, which may or may not be made from two different materials, and then assembled together to be handled as a single component assembled fastener. The diameter of the sleeve portion 1002 may be uniform along the entire length of the sleeve portion defining a straight wall. The sleeve portion 1002, which may undergo a localized heat treatment section 1006 to alter the mechanical properties of the sleeve 1000 such that an upset head may be created properly within the desired grip range. This type of design may allow material combinations such that the sleeve portion 1002 may be made of high strength material, enhancing shear strength of the fastener, while the collar portion 1004 may be made of a soft material to reduce the swaging load, insuring proper engagement with external grooves (or threads) on a locking groove section (or externally threaded portion) of the sleeve, as described above.

A collar portion exterior geometry 1008 and a sleeve portion interior (or internal) geometry 1010 may be designed or configured such that, during the process of assembling the fastener components or during the installation of the fastener in the structure, there may be an enhanced engagement 1012

(See FIG. 12) between the collar portion 1004 and the sleeve portion 1002, as discussed below.

An inner core pin 1014, according to one aspect, may include an elongated pin shank terminating at a first pin end in a head section 1016 and terminating at a second pin end in a locking groove section (or externally threaded portion) 1018. The elongated pin shank may include a first pin (or shank) section 1020, a second pin (or transitional) section 1022 and the locking groove section (or externally threaded portion) 1018. As described above, the head section 1016 may be designed to fit into the inner geometrical shape of the sleeve 1000. Although the head section 1016 may be in the form of a flush head design, as shown, this is by way of example only and other geometrical designs as required by the application of the fastener are contemplated. The inner core pin 1014 may be inserted into the sleeve 1000 creating a single assembled fastener 1024. In this assembled form, the fastener 1024 may be handled as a single piece fastener thus greatly simplifying the installation process.

Figure 12:
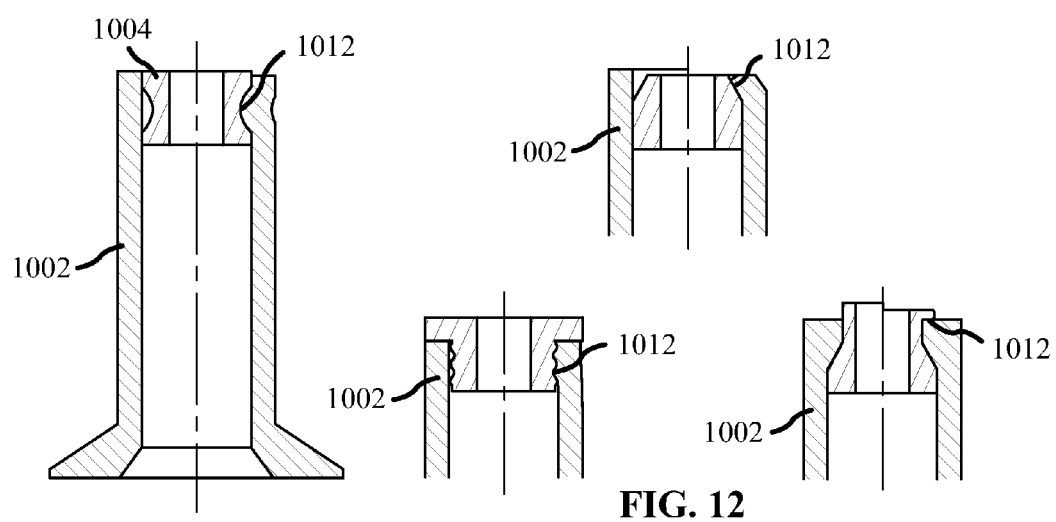
FIG. 12 illustrates side views of various geometric designs and interfaces of the collar portion and the sleeve portion of the multi-component sleeve of FIG. 10, in accordance with an aspect of the present invention.

The multi-component sleeve design may also have other benefits that would simplify the manufacturing process by allowing for the adoption of less complicated manufacturing equipment and tooling, as illustrated in FIGS. 10-12.

As shown in FIG. 11, the tapered walled sleeve 1100 may include an elongated hollow cylindrical sleeve portion (or shank) terminating at a first sleeve end in an enlarged preformed sleeve head 1102, having an opening in an outer top surface 1104 for receiving the pin, and terminating at a second sleeve end, having an opening in outer bottom surface.

Similar to the sleeve head 502 discussed above with reference to FIG. 5, the form and shape of the sleeve head 1102 may be designed so that the geometry of the internal sleeve head surface and the external sleeve head surface of the sleeve 1100 may be engaged with (i.e. matched), or directly aligned with, the external pin head side surface and a bottom surface of a structure, respectively.

The cylindrical sleeve portion may have an outer wall and an inner wall defining an opening in the sleeve 1100. Additionally, the cylindrical sleeve portion may comprise a first sleeve section 1108, a second sleeve section 1110 and a collar section 1112.

The first sleeve section 1108 may be of uniform diameter such that the outer wall of the first sleeve section 1108 is straight or at a 90° angle relative the outer top surface 1104 of the preformed head 1102. The second sleeve section 1110 may be of variable diameter such that the second sleeve section 1110 tapers inwardly from a first point 1114 to a second point 1116, the first point 1114 may be integrally connected to the first sleeve section 1108 and the second point 1116 may be integrally connected to the collar section 1112. In one aspect, the largest diameter of the second sleeve section 1110 may be equal to the diameter of the first sleeve section 1108 and the smallest diameter of the second sleeve section 1110 may be equal to the diameter of the collar section 1112.

Tapering the second sleeve section 1110 may ensure upset head formation against the structure in the intended grip range, as discussed above with reference to FIG. 6. Additionally, the second sleeve section 1110 may also be thermally treated to produce a variable hardness region, as discussed above with reference to FIG. 10, which naturally deforms first at the softest location, which may be adjacent to the structure in the intended grip range. Furthermore, the second sleeve section 1110 may be incorporated with a suitable thermal treatment to further ensure obtaining the desired upset head geometry during the final installation process.

An inner core pin 1118, according to one aspect, may include an elongated pin shank terminating at a first pin end in a head section 1120 and terminating at a second pin end in a locking groove section (or externally threaded portion) 1120. The elongated pin shank may include a first pin (or shank) section 1122, a second pin (or transitional) section 1124 and the locking groove section (or externally threaded portion) 1120. As described above, the head section 1120 may be designed to fit into the inner geometrical shape of the sleeve 1100. Although the head section 1120 may be in the form of a flush head design, as shown, this is by way of example only and other geometrical designs as required by the application of the fastener are contemplated. The inner core pin 1118 may be inserted into the sleeve creating a single assembled fastener 1124.

FIG. 12 illustrates side views of various geometric designs and interfaces of the collar portion 1004 and the sleeve portion 1002 of the multi-component sleeve of FIG. 10. As discussed above, the interface of the collar portion exterior geometry 1008 and the sleeve portion interior geometry 1110 may be designed such that, during the process of assembling the fastener components or during the installation of the fastener in the structure, there may be an enhanced engagement 1012 between the collar portion 1004 and the sleeve portion 1002. That is, it may be ensured that the collar portion 1004 and sleeve portion 1002 are intimately engaged. In other words, the collar portion 1004 may be inserted into the sleeve portion 1002.

This design concept may be adopted to promote formation of an upset head, facilitate swaging of the collar portion 1112 around the locking groove section (or externally threaded portion) 1018, and enhance mechanical properties such as tensile, shear and fatigue life of the joint. Such designs may be application dependent and are expansions of basic design concepts herein. The basic general concepts offered herein can be utilized for obtaining the specific desired features for these types of fasteners.

Figure 13:
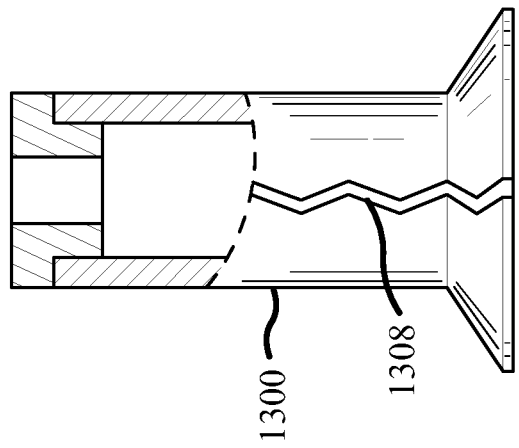
FIG. 13 illustrates side views of various geometric designs for a split sleeve, in accordance with an aspect of the present invention.
Figure 13:
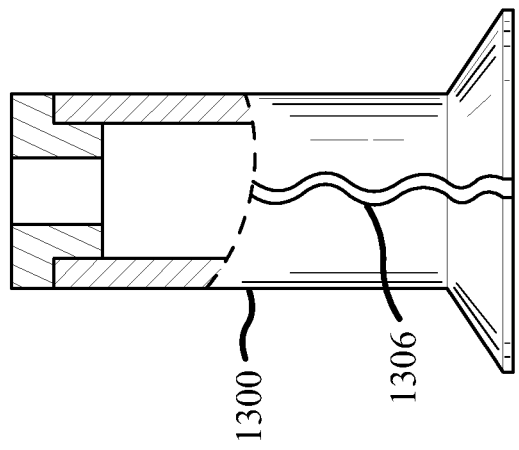
Figure 13:
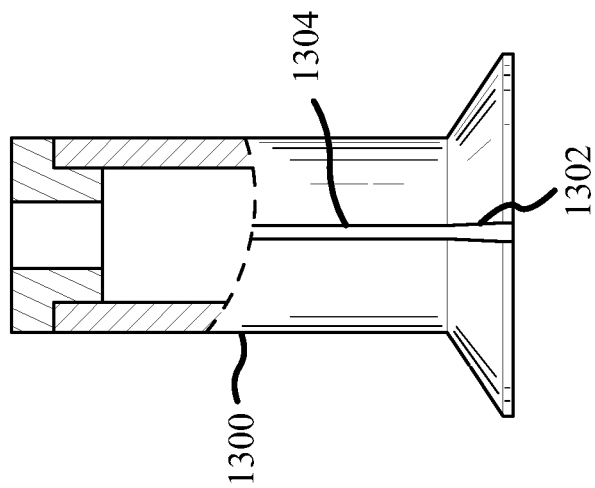

The concept of the multi-component collar section described above may also be utilized with a split sleeve. FIG. 13 illustrates side views of various geometric designs for a split sleeve in accordance with an aspect of the present invention. As shown, a sleeve 1300 may include a split seam 1302, of certain geometric shapes, including, but not limited to, a straight seam 1304, a multi curved seam 1306, or a multi angled seam 1308, and may provide superior radial expansion of the fastener and thus better hole fill at lower installation loads. A split sleeve 1300 may also provide cost saving advantages and ease of production due to the fact that they could be produced by stamping and then wrapping operations rather than the more complicated heading operation.

The concept of the multi-component collar section described above offers numerous design possibilities with distinct advantages over existing fasteners. Such a concept does not limit itself only to the concept of integrated sleeve collar designs. For example, the multi-component collar section may be readily applicable to all lockbolts presently being used having only a pin and a collar components as shown in FIG. 4.

Figure 14:
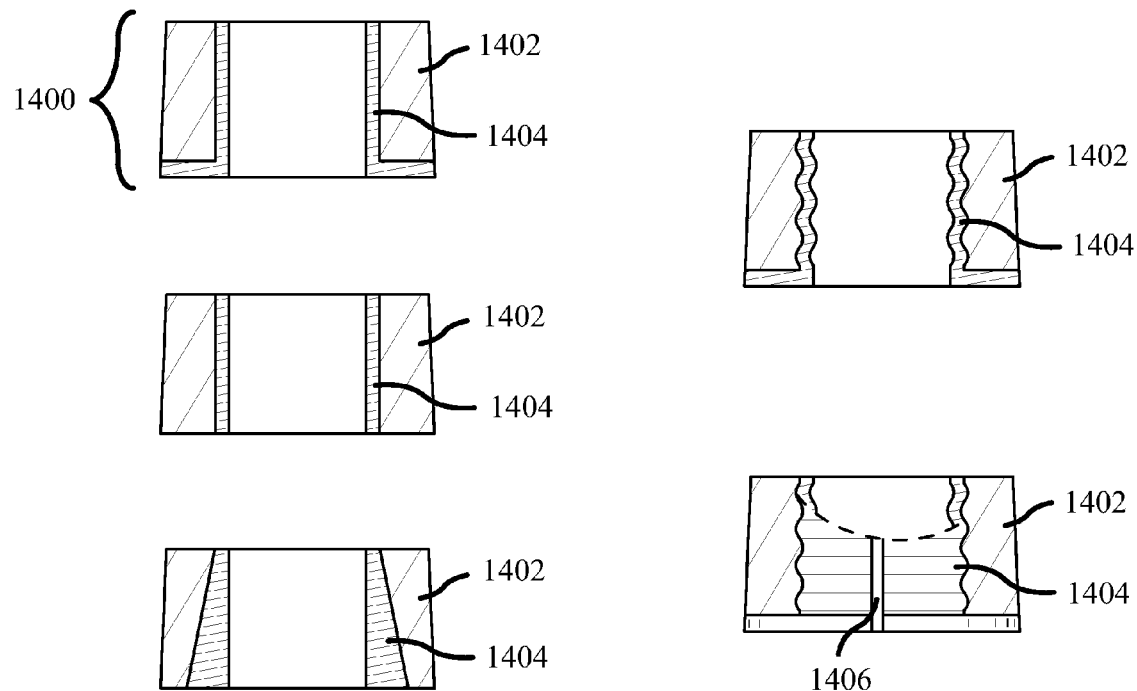
FIG. 14 illustrates side views of various geometric designs of a multi-component lock collar incorporating a secondary insert, in accordance with an aspect of the present invention.

FIG. 14 illustrates side views of various geometric designs of a multi-component lock collar 1400, incorporating a secondary insert. The multi-component lock collar 1400 may further advance the application of lockbolts and improve the desired mechanical properties of this class of fasteners. These multi-component lock collars 1400 may comprise a sheath 1402 and an insert 1404, of different materials, and of different geometric shapes, such that the interaction of the sheath 1402 and the insert 1404 may combine to act similarly to the collar section 1004 (see FIG. 10), when used in combination with a sleeve portion 1002 (See FIG. 10). Alternatively, the multi-component lock collar 1400 could be used as a direct replacement for current lock collars 404 and 406 (see FIG. 4). The preferred design and material combination depends on the desired mechanical properties of the joint, weight, corrosion properties, reduction of installation load and other relevant considerations. The multi-component lock collar 1400 design may be used with a split sleeve 1406.

Hole Filling Shear Pin Fastener For Composite Structure

In the case of composite structures, it may be important to adopt a fastener design concept that ensures a limited but adequate hole filling feature. The conceptual design and the novel innovations presented herein provide such a feature. The basic design for achieving a hole filling property may be incorporated in the core pin design.

Figure 15:
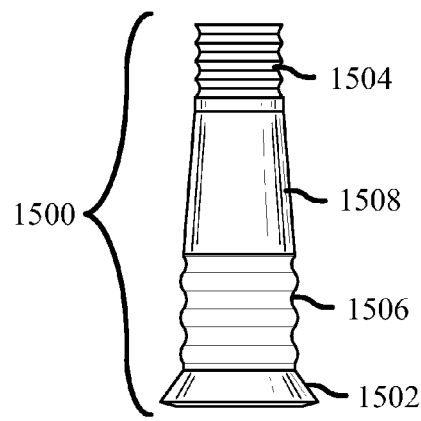
FIG. 15 illustrates an expander core pin, in accordance with an aspect of the present invention.

Turning to FIG. 15, an expander core pin 1500 according to one aspect of the present invention is illustrated. The expander core pin 1500 may include an elongated pin shank terminating at a first pin end in a head section 1502 and terminating at a second pin end in a locking groove section (or externally threaded portion) 1504. The elongated pin shank may include a first pin (or expander shank) section 1506, a second pin (or transitional) section 1508 and the locking groove section (or externally threaded portion) 1504. As with the head section 702 of FIG. 7, the head section 1502 may be designed to fit into the inner geometrical shape of a sleeve. Although the head section 1502 may be in the form of a flush head design, as shown, this is by way of example only and other geometrical designs as required by the application of the fastener are contemplated.

Figure 16:
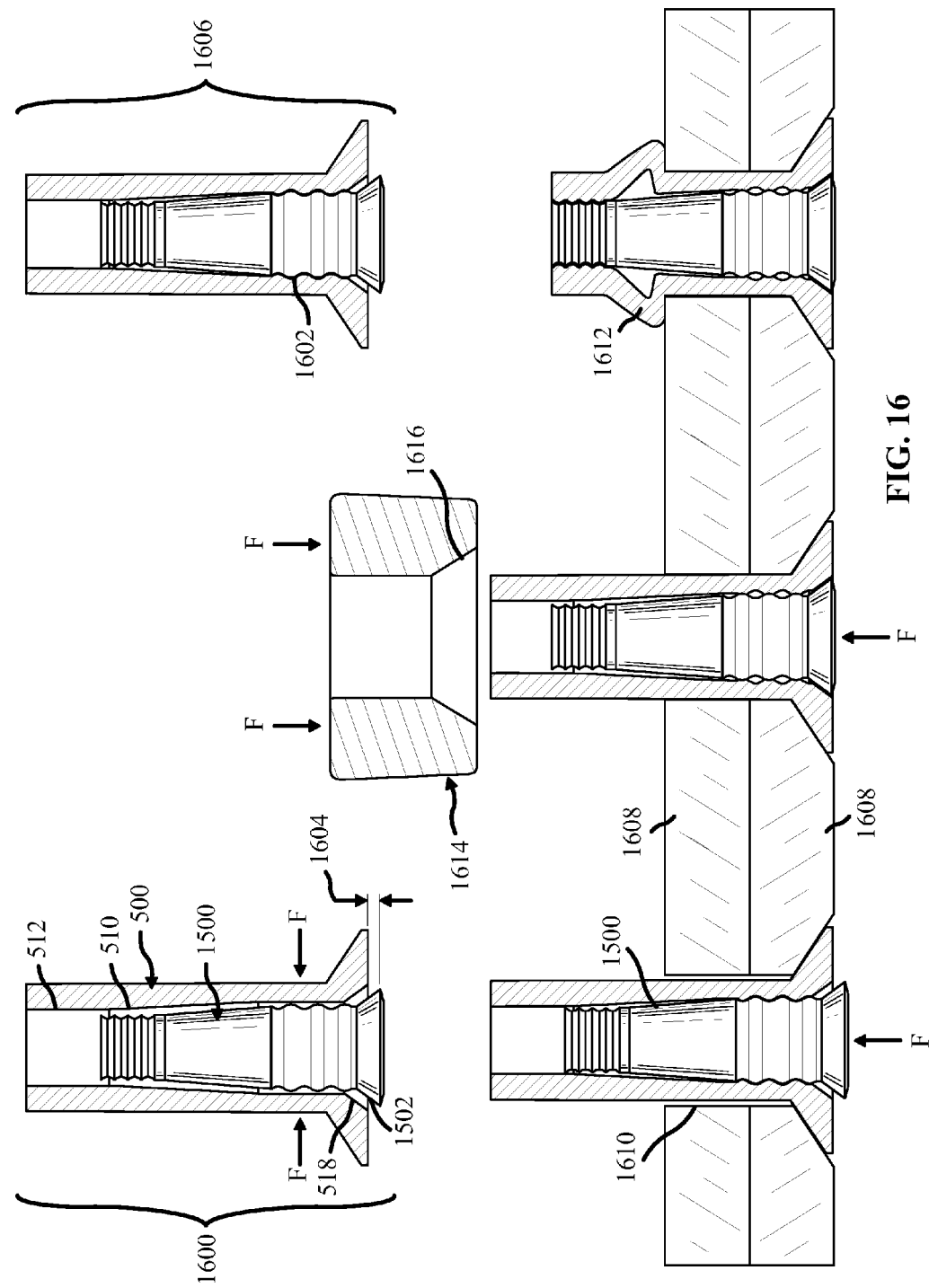
FIG. 16 illustrates a side view assembly of the expander core pin of FIG. 15 and the sleeve of FIG. 5, in accordance with an aspect of the present invention.

FIG. 16 illustrates a side view assembly of the core pin expander 1500 of FIG. 15 in the sleeve 500 of FIG. 5 and the installation process of the fastener being secured to a structure in accordance with an aspect of the present invention. The enlarged head portion 1502 of the pin 1500 may include a specific geometry for proper engagement (i.e. matching) with the sleeve 500. The first pin (or expander shank) section 1506 of the pin 1500 may include a series of grooves or threads. The grooves or threads may be annular, axial, helical, or any combination thereof, as may be needed for specific application and/or required for different material combinations.

The desired hole fill may be achieved when the sleeve 500 is expanded by the expander core pin 1500 during the installation process in the structure. The unique design of this invention provides for the presence of additional deformable material in an interface section 1602 of the sleeve 500 and the core pin 1500 such that with a limited axial movement of the pin 1500 within the sleeve 500, the sleeve 500 may be expanded radially into the pin 1500 to fill the hole and make soft contact with the structure. This feature of providing interference material may be accomplished during the preassembly of the sleeve 500 and pin 1500.

To assemble the fastener 1600, the expander core pin 1500 may be preassembled in the sleeve 500 such that there is a gap 1604 between the pin head 1502 and the sleeve inner geometric shape 518. The preassembled fastener 1600 may then be subjected to an inward radial force F such that the sleeve 500 may be compressed radially inward around the expander core pin 1500 to the extent that the sleeve wall internally deforms into the grooves or valleys and serrations of the first pin (or expander shank) section 1506, completing the assembly process. The assembled expanding fastener 1606 can now be treated as a single component and may be easily adoptable for application with automated installation equipment.

To install the assembled expanding fastener 1606 into a structure or work piece 1608, the assembled expanding fastener 1606 may be placed in a prepared aperture 1610, where upon the application of force F at both ends of the fastener 1606, the expander core pin 1500 may be moved axially. As the pin 1500 is moved axially in relation to the sleeve 500, the ridges of the core pin 1500 may interfere with the sleeve 500, moving the sleeve 500 radially outward to fill the hole. The magnitude of hole fill may be controlled by the size of the ridges. The malleability of the sleeve material may allow the hole fill to take place without damaging the composite material.

After the gap 1604 is taken up or closed, continued application of force F may cause the sleeve 500 to collapse and form an upset head 1612 against the structure. Application of more force F, along with the aid of the setting anvil 1614 having a specific inner geometrical design 1616, may cause the third sleeve (or sleeve lock collar) section 512 to intimately engage with the core pin grooves 1508 and complete the interlocking and installation process.

Self Sealing Sleeve Design

Self Sealing fasteners are often used in construction of containers, tanks, and vessels for storing fluids such as fuels and other chemicals. In these types of applications it is imperative to prevent leakage of fluid through the fastener holes. It has been observed that the fluid leakage often takes place through the unfilled spaces between the fasteners and the structure, or within the components of a multi-component fastener. To prevent the occurrence of leakage, the approach often chosen includes the application of a sealant compound to the fastener and the structure during the installation process, as well as the selection of a fastener hole diameter to create interference between the fastener shank and the structure, ensuring a hole filling installation.

However, certain problems are associated with this solution, including the added costs due to the addition of a sealant application operation, requiring special preparations and clean up. The chemical composition of the sealant should also be compatible with the stored fluid in the tank, thus requiring a careful study, and often extensive time consuming experiments, to ensure that for the expected life of the structure, the sealant will remain stable, and not alter, become brittle, nor deteriorate in any other form after installation. Another problem associated with application of sealant on fasteners would occur during the installation of the fasteners as the sealant often penetrates within the fastener components, negatively effecting proper installation of the fastener. The presence of sealant fluid within fastener components can create the phenomenon known as hydraulic locking, which often takes place during the lockbolt fastener installation process, and prevents proper swaging of the locking collar into the locking grooves of the pin.

Figure 17:
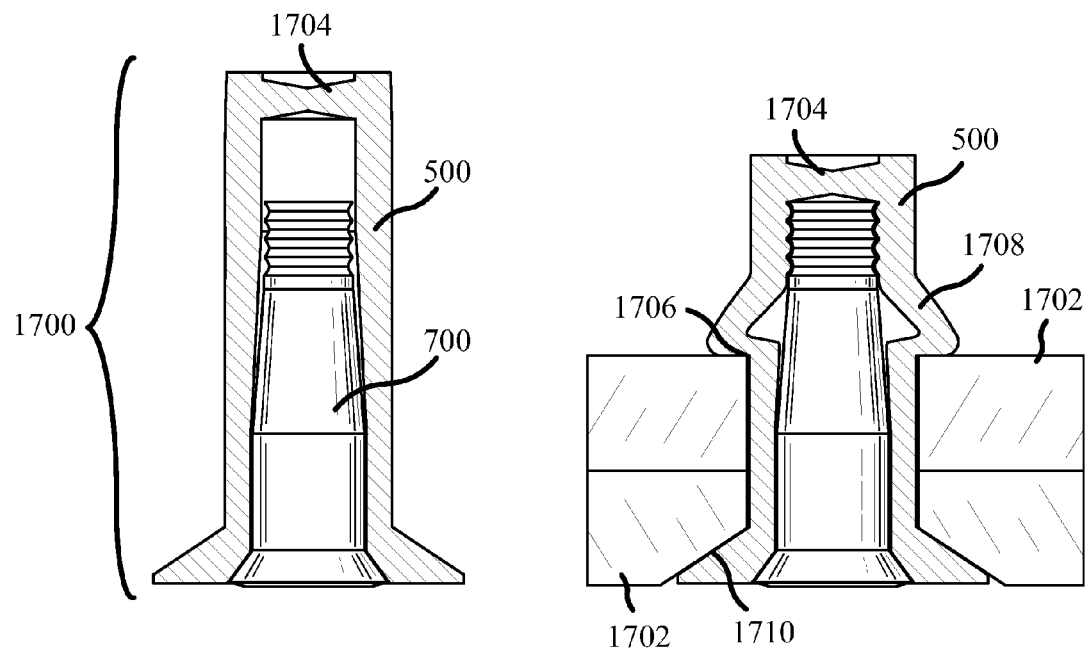
FIG. 17 illustrates a side view of a sealing fastener being secured to a structure, in accordance with an aspect.
Figure 18:
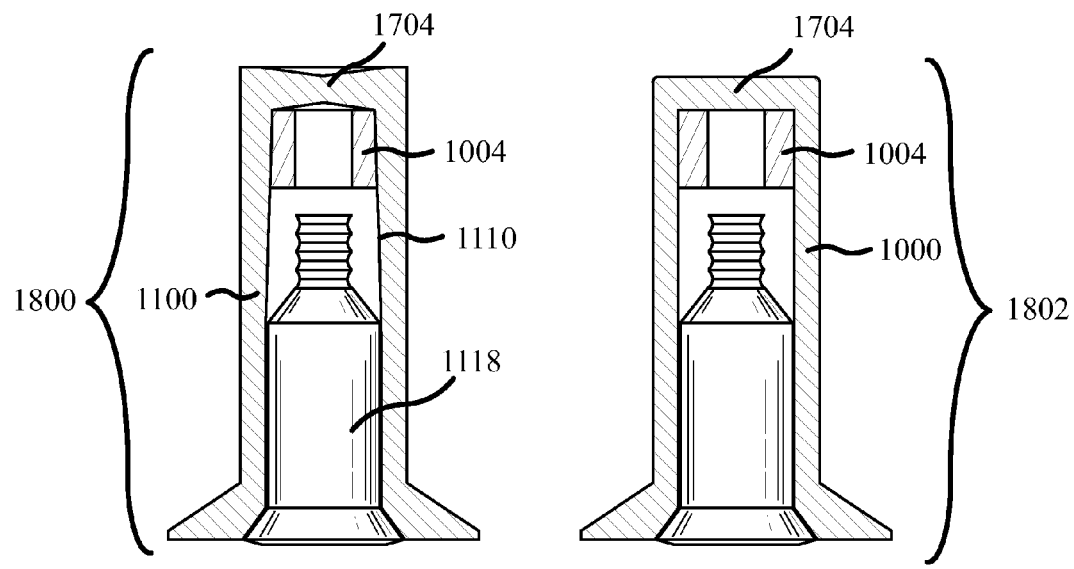
FIG. 18 illustrates side views of sealing fasteners, in accordance with an aspect of the present invention.
Figure 19:
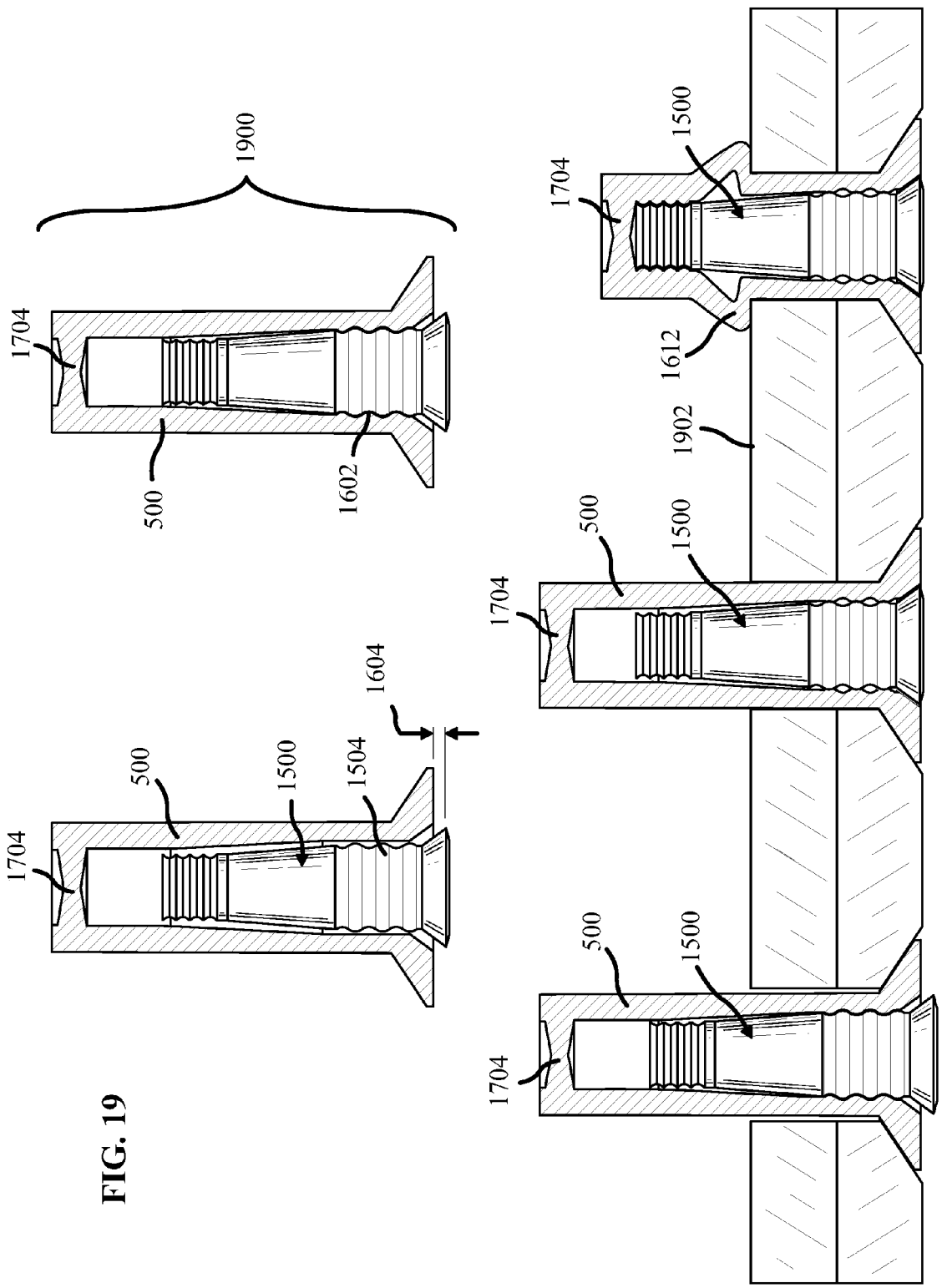
FIG. 19 illustrates a side view of a hole expanding sealing fastener being secured to a structure, in accordance with an aspect of the present invention.

FIGS. 17-19 illustrate sealing fasteners having a Sealed Type Integrated Sleeve design, according to one aspect, to alleviate the problems discussed above. FIG. 17 illustrates a side view of a sealing version of a fastener 1700, having the core pin 700 of FIG. 7 and the sleeve 500 of FIG. 5, being secured to a structure 1702 in accordance with an aspect. FIG. 18 illustrates side views of sealing versions of fasteners 1802, 1804, having the core pin of FIG. 10 and the multi-component sleeves of FIG. 11 and FIG. 10, respectively, in accordance with an aspect. FIG. 19 illustrates a side view of a hole expanding sealing fastener 1900 having the core pin 1500 of FIG. 15 and the sleeve 1100 of FIG. 11, being secured to a structure 1902 in accordance with an aspect.

The sealed sleeve design, being of either a single component sleeve (See FIGS. 17 and 18) or a multi-component sleeve (See FIG. 19) may include an integrated cap 1704 for sealing the leak path 1706 through a sleeve and core pin interface. The leak path 1706 through the sleeve and structure interface may be closed by the contact of the sleeve upset head 1708 formation to the work piece and the contact 1710 of the manufactured head to the work piece during the installation of the fastener 1700.

Integrated Sleeve/Core Pin Pull Type

To accommodate automated installation sequences and quicker manual installations, a pull type core pin 2000 can be made such that installation of a prepositioned fastener takes place from only one side of the work piece 2002. This is accomplished by incorporating a breakaway tail section 2004 to the pin 1500 (see FIG. 20). This tail section 2004 may include a series of serrations (or grooves or threads) 2006 for engagement with an installation tool, as well as a break notch area 2008 designed to separate the tail section of the stem from the main body when the appropriate force is applied.

This fastener may be assembled in a similar manner to FIG. 8 but in such a way that the breakaway tail section 2004 is protruding from the sleeve 500, before being placed into a prepared aperture 2010 of the work piece 2002. An installation tool of specific geometry and design, containing both pulling jaws 2012 and forming anvil 2014, may be positioned over the pull type core pin 2000 such that the pulling jaws 2012 engage with the grooves or serrations 2006 and the forming anvil 2014 makes contact with the sleeve end 506. This installation tool may be designed to provide an axial pulling force F on the pull type core pin 2000 as well as an equal and opposite axial pushing force F on the sleeve end 506 through the forming anvil 2014, thus seating the manufactured head of the fastener and upsetting the sleeve to form the upset head 2016. Continued application of axial pushing force F of the forming anvil 2014 on the sleeve 500 forces the third sleeve section 512 of the sleeve 500 inwardly around locking grooves 2018 of the pull type core pin 2000, and forms the permanent interlocking feature 2020, engaging the sleeve 500 and pull type core pin 2000. Continued application of axial pulling force F provides the load needed to separate the breakaway tail section 2004 from the inner core pin 2000 at the break notch section 2008, completing the installation of the pull type style.

Integrated Sleeve/Core Pin Pull Type with Hole Filling Feature

Figure 20:
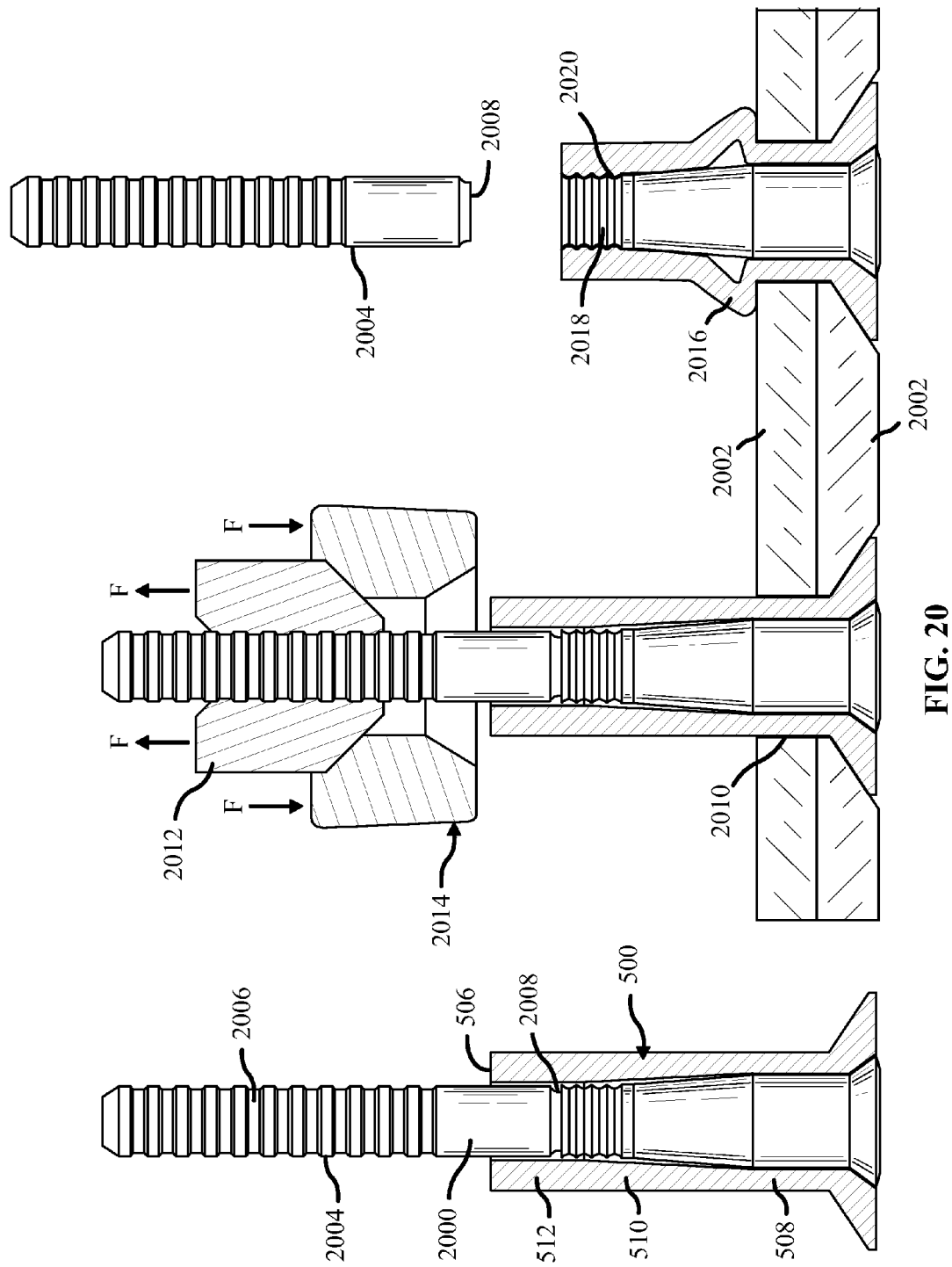
FIG. 20 illustrates a side view of a pull type fastener being secured to a structure, in accordance with an aspect of the present invention.
Figure 21:
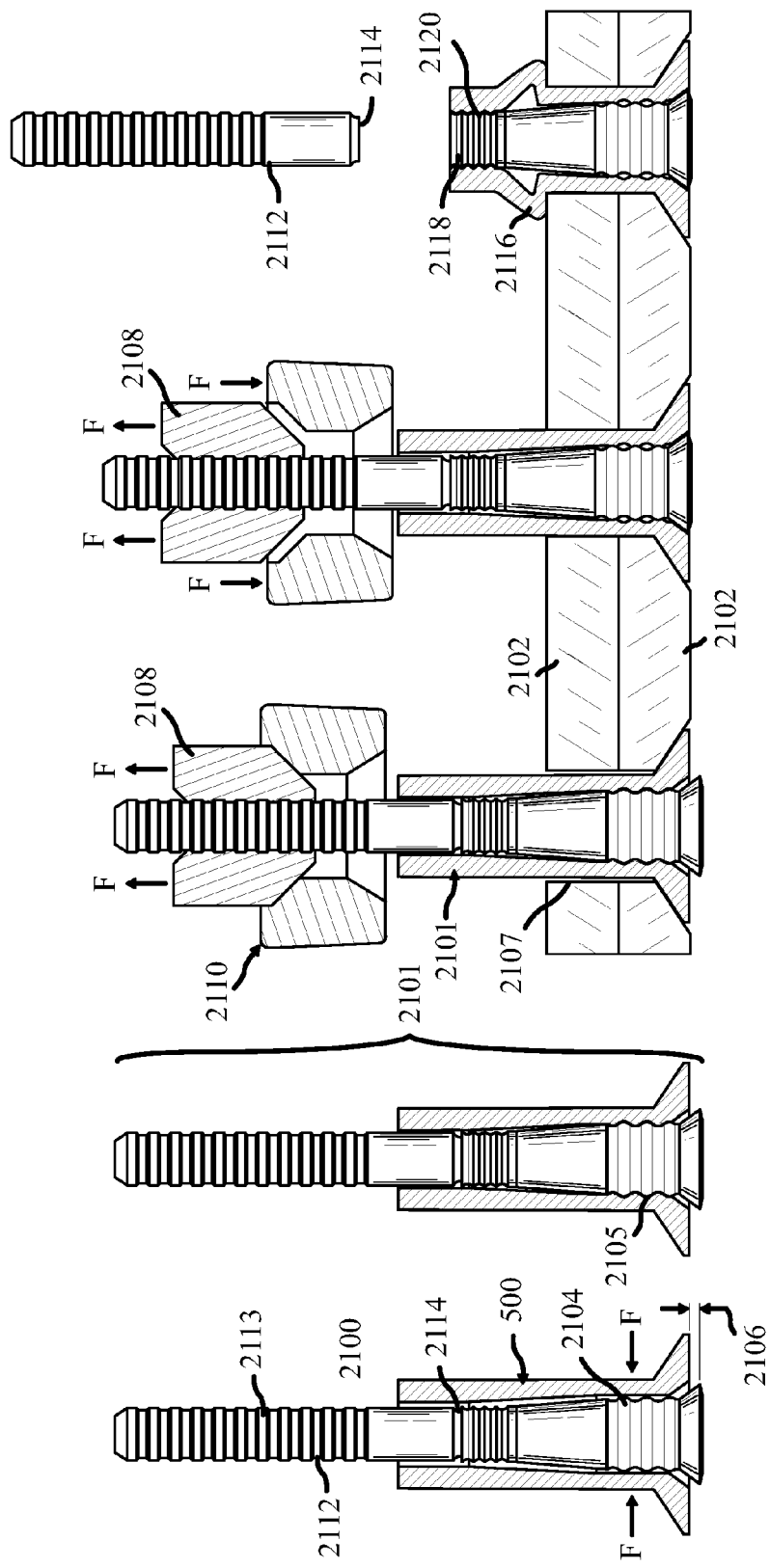
FIG. 21 illustrates a side view of a hole expanding pull type version of the fastener being secured to a structure, in accordance with an aspect of the present invention.

FIG. 21 illustrates a side view of a hole expanding pull type version of the fastener of FIG. 20 being secured to a structure 2102 in accordance with an aspect. As shown, the pull type core pin 2100 can be manufactured with an expandable shank section 2104 for use in a hole filling pull type fastener 2101. Similar to FIGS. 19 and 20, a sleeve 500 is formed radially inward 2105 onto the first pin (or expandable shank) section 2104 of the core pin 2100, with a gap 2106.

During installation, axial movement of the pin 2100 in relation to the sleeve 500 forces the sleeve 500 radially outward into a prepared aperture 2107 of the work piece 2102. Continued force F act to deform the sleeve 500, creating an upset head 2116, and permanent interlocking feature 2120, as well as separates the breakaway tail section 2112 from the inner core pin 2100 at the break notch section 2114, completing the installation.

An installation tool of specific geometry and design, containing both pulling jaws 2108 and forming anvil 2110, may be positioned over the pull type core pin 2100 such that the pulling jaws 2108 engage with the serrations 2113 and the forming anvil 2110 makes contact with the sleeve end 506. This installation tool may be designed to provide an axial pulling force F on the pull type core pin 2100, in relation to the sleeve 500, as well as an equal and opposite axial pushing force F on the sleeve end 506 through the forming anvil 2110, thus seating the manufactured head of the fastener and upsetting the sleeve to form the upset head 2116. Continued application of axial pushing force F of the forming anvil 2110 on the sleeve 500 forces the third sleeve section 512 of the sleeve 500 inwardly around locking grooves 2118 of the pull type core pin 2100, and forms the permanent interlocking feature 2020, engaging the sleeve 500 and pull type core pin 2100. Continued application of axial pulling force F provides the load needed to separate the breakaway tail section 2124 from the inner core pin 2100 at the break notch section 2114, completing the installation of the pull type style.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications are possible. Those skilled, in the art will appreciate that various adaptations and modifications of the just described preferred embodiment can be configured without departing from the scope and spirit of the invention. Therefore, it is to be understood that, within the scope of the appended claims, the invention may be practiced other than as specifically described herein.

The invention claimed is:

1. A fastener for securing one or more components of a structure comprising:
   a pin having an elongated pin shank, terminating at a first pin end in a pin head and terminating at a second pin end in an externally threaded portion, and a transitional section integrally connected between the first pin end and the second pin end, the pin head having an external pin head side surface; and
   a deformable sleeve having a hollow tubular shank terminating at a first sleeve end in a sleeve head having an opening for receiving the pin and terminating at a second sleeve end having an internal sleeve head surface for engagement with the external pin head side surface when in an assembled position, and where the hollow tubular shank internally comprises:
   a first sleeve section integrally connected to the first sleeve end; a second sleeve section integrally connected to the first sleeve section; and a third sleeve section, integrally connected to the second sleeve section and the second sleeve end, having an internal surface for engaging the externally threaded portion of the pin upon installation; and
   wherein the second sleeve section tapers inwardly from a first point to a second point, wherein the first point is integrally connected to the first sleeve section and wherein the second point is integrally connected to the third sleeve section; and
   wherein the third sleeve section is of uniform diameter from the second point to the second sleeve end.

2. The fastener of claim 1, wherein application of a load at the second sleeve end causes the second section to buckle downward and expand radially outward to form an upset head.

3. The fastener of claim 1, wherein application of an installation load at the second sleeve section causes the internal surface of the third sleeve section to deform radially inward, engaging with the externally threaded portion of the pin forming a permanent interlocking feature.

4. The fastener of claim 1, wherein at least one of the first sleeve section, the second sleeve section and the third sleeve section is heat treated to enhance buckling of the sleeve and formation of an upset head.

5. The fastener of claim 1, wherein the pin is at least one of a stump type pin and a pull type pin.

6. The fastener of claim 1, wherein the deformable sleeve further comprises a collar portion inserted into the second sleeve end of the hollow tubular shank.

7. The fastener of claim 6, wherein the hollow tubular shank and the collar portion are made of different materials.

8. The fastener of claim 6, wherein the collar portion comprises a sheath and an insert received within the sheath and wherein the sheath and the insert are made of different materials.

9. The fastener of claim 1, wherein the pin further comprises a first pin section integrally connected to the pin head and the transitional section integrally connected between the first pin section and the externally threaded portion, wherein the first pin section includes a series of grooves and wherein the deformable sleeve expands radially into the series of grooves during installation in the structure.

10. The fastener of claim 1, wherein the sleeve includes one or more axial or diagonal slits for facilitating expansion of the sleeve when placed within an aperture of the structure.

11. The fastener of claim 1, wherein the second sleeve end is a closed end for preventing leakage of fluids and gases around the pin and through the sleeve.

12. The fastener of claim 1, wherein an internal surface of the sleeve includes a first plurality of grooves, wherein an outer surface of the pin includes a second plurality of grooves, and wherein the first plurality of grooves are engaged with the second plurality of grooves when the sleeve and the pin are in an assembled position.

13. The fastener of claim 1, wherein the pin further comprises a breakaway tail integrally connected to the externally threaded portion.

14. The fastener of claim 1, wherein the first sleeve section is of uniform diameter from the first sleeve end to the first point; and wherein the uniform diameter of the first sleeve section is greater than the uniform diameter of the third sleeve section.

15. The fastener of claim 1, wherein the second sleeve section has a varying diameter, the varying diameter of the second sleeve section decreasing from the first point to the second point;
  wherein the varying diameter of the second sleeve section at the first point is equal to the uniform diameter of the first sleeve section; and
  wherein the varying diameter of the second sleeve section at the second point is equal to the uniform diameter of the second sleeve section.

16. A fastener for securing one or more components of a structure comprising:

a pin having an elongated pin shank, terminating at a first pin end in a pin head and terminating at a second pin end in an externally threaded portion, and a transitional section integrally connected between the first pin end and the second pin end, the pin head having an external pin head side surface; and
  a deformable sleeve having a hollow tubular shank terminating at a first sleeve end in a sleeve head having an opening for receiving the pin and terminating at a second sleeve end having an internal sleeve head surface for engagement with the external pin head side surface when in an assembled position, and where the hollow tubular shank internally comprises:
  a first sleeve section integrally connected to the first sleeve end; a second sleeve section integrally connected to the first sleeve section; and a third sleeve section, integrally connected to the second sleeve section and the second sleeve end, having an internal surface for engaging the externally threaded portion of the pin upon installation; and
  wherein the second sleeve section tapers inwardly from a first point to a second point, wherein the first point is integrally connected to the first sleeve section and wherein the second point is integrally connected to the third sleeve section; and
  wherein the third sleeve section is of uniform diameter from the second point to the second sleeve end: and
  where the pin and the deformable sleeve, in the assembled position, are inserted into an aperture in the structure and upon application of a force to the pin head and the second sleeve end, the second sleeve section deforms spreading radially outward creating an upset head in direct contact with a surface of the structure.

17. The fastener of claim 16, wherein the pin further comprises a first pin section integrally connected to the pin head and the transitional pin section integrally connected between the first pin section and the externally threaded portion, wherein the first pin section includes a series of grooves and wherein the deformable sleeve expands radially into the series of grooves during installation in the structure.

18. The fastener of claim 16, wherein the deformable sleeve further comprises a collar portion inserted into the second sleeve end of the hollow tubular shank.

19. The fastener of claim 18, wherein the hollow tubular shank and the collar portion are made of different materials.

20. The fastener of claim 18, wherein the collar portion comprises a sheath and an insert received within the sheath and wherein the sheath and the insert are made of different materials.

* * * * *